(12) United States Patent
Wang et al.

(10) Patent No.: US 12,393,903 B2
(45) Date of Patent: Aug. 19, 2025

(54) DETERMINING SHORTCUT RELATIONSHIPS IN DATA MODELS

(71) Applicant: Tableau Software, LLC, Seattle, WA (US)

(72) Inventors: Qianfan Wang, Seattle, WA (US); Qiang Kong, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 142 days.

(21) Appl. No.: 18/102,155

(22) Filed: Jan. 27, 2023

(65) Prior Publication Data

US 2024/0257027 A1     Aug. 1, 2024

(51) Int. Cl.
  *G06F 3/0484*     (2022.01)
  *G06Q 10/067*     (2023.01)

(52) U.S. Cl.
  CPC ......... *G06Q 10/067* (2013.01); *G06F 3/0484* (2013.01)

(58) Field of Classification Search
  CPC .... G06Q 10/047; G06Q 10/067; G06Q 10/06; G06F 16/9024; G06F 16/26; G06F 16/288; G06F 8/433; G06F 16/248; G06F 16/287; G06F 16/904
  See application file for complete search history.

(56) References Cited

U.S. PATENT DOCUMENTS

| | | | |
|---|---|---|---|
| 5,550,971 A | 8/1996 | Brunner et al. | |
| 5,689,711 A | 11/1997 | Bardasz et al. | |
| 8,286,087 B1 | 10/2012 | Xian et al. | |
| 8,631,094 B1 * | 1/2014 | Alpert | G06F 17/10 707/637 |
| 8,825,646 B1 * | 9/2014 | Alpert | H04L 67/02 707/737 |

(Continued)

FOREIGN PATENT DOCUMENTS

WO     2006060773 A2     6/2006

OTHER PUBLICATIONS

Adriaens, Florian et al., Discovering Interesting Cycles in Directed Graphs 28th International Conference on Information and Knowledge Management, CKIM'19, Nov. 2019 (Year: 2019).*

(Continued)

*Primary Examiner* — Scott L Jarrett
(74) *Attorney, Agent, or Firm* — Morgan, Lewis & Bockius LLP

(57) ABSTRACT

Embodiments are directed to managing data using network computers. A data model that includes a plurality of data objects, a plurality of data relationships, and a plurality of shortcuts may be provided. If portions of the data model being are selected in the user interface for removal from the data model further actions may be performed, including: determining edges and nodes associated with the portion of the data model; determining critical edges that may be associated with nodes included in the portion of the data model; traversing the data model based on the critical edges; determining critical shortcuts based on the traversal and shortcut specifications that may match the critical shortcuts; modifying the data model by deleting each critical shortcut unmatched to the shortcut specifications and deleting the selected portions of the data model along with the associated plurality of nodes and edges; or the like.

20 Claims, 10 Drawing Sheets

(56) References Cited

U.S. PATENT DOCUMENTS

| | | | |
|---|---|---|---|
| 9,135,565 B1* | 9/2015 | Khalefa | G06N 99/00 |
| 9,383,913 B2 | 7/2016 | Hoyer et al. | |
| 9,489,119 B1 | 11/2016 | Smith, Jr. | |
| 9,760,240 B2 | 9/2017 | Maheshwari et al. | |
| 9,881,066 B1 | 1/2018 | Yousaf et al. | |
| 10,274,329 B2* | 4/2019 | Mas-Ud Hussain | G01C 21/3694 |
| 10,275,265 B1 | 4/2019 | Gould et al. | |
| 10,445,170 B1 | 10/2019 | Subramanian et al. | |
| 10,698,955 B1* | 6/2020 | Broecheler | G06F 16/90335 |
| 10,705,695 B1 | 7/2020 | Porath et al. | |
| 10,783,162 B1* | 9/2020 | Montague | G06F 16/2465 |
| 11,029,927 B2* | 6/2021 | ChoFleming, Jr. | G06F 8/443 |
| 11,194,849 B2* | 12/2021 | Lassoued | G06N 5/022 |
| 11,567,998 B2* | 1/2023 | Armbrust | G06F 16/245 |
| 11,693,633 B2* | 7/2023 | ChoFleming, Jr. | G06F 8/34 717/109 |
| 12,093,245 B2* | 9/2024 | Ye | G06Q 20/40 |
| 12,105,742 B2* | 10/2024 | Verma | G06F 16/9024 |
| 2004/0205562 A1 | 10/2004 | Rozek et al. | |
| 2006/0064674 A1 | 3/2006 | Olson Jr. et al. | |
| 2008/0126987 A1 | 5/2008 | Meschian et al. | |
| 2009/0006939 A1 | 1/2009 | DeSpain et al. | |
| 2009/0007122 A1 | 1/2009 | Peyton et al. | |
| 2009/0012983 A1 | 1/2009 | Senneville et al. | |
| 2010/0114629 A1 | 5/2010 | Adler et al. | |
| 2010/0138420 A1 | 6/2010 | Bator et al. | |
| 2010/0235771 A1 | 9/2010 | Gregg, III | |
| 2010/0313157 A1 | 12/2010 | Carlsson et al. | |
| 2010/0318583 A1 | 12/2010 | Cohen | |
| 2011/0219321 A1 | 9/2011 | Gonzalez Veron et al. | |
| 2012/0311497 A1 | 12/2012 | Bear et al. | |
| 2013/0339352 A1* | 12/2013 | Jin | G06F 16/9024 707/736 |
| 2014/0026084 A1 | 1/2014 | Gilboa | |
| 2014/0058789 A1 | 2/2014 | Doehring et al. | |
| 2014/0074888 A1 | 3/2014 | Potter et al. | |
| 2014/0114907 A1 | 4/2014 | Kozina et al. | |
| 2014/0215405 A1 | 7/2014 | Breedvelt-Schouten | |
| 2014/0267287 A1 | 9/2014 | Dodgen et al. | |
| 2014/0330821 A1 | 11/2014 | Tullis et al. | |
| 2014/0372956 A1 | 12/2014 | Bisca et al. | |
| 2015/0019592 A1* | 1/2015 | Jin | G06F 16/9024 707/798 |
| 2015/0112998 A1 | 4/2015 | Shankar et al. | |
| 2015/0317336 A1* | 11/2015 | Dubsky | G06F 16/285 707/803 |
| 2015/0339263 A1 | 11/2015 | Abu El Ata et al. | |
| 2015/0347091 A1 | 12/2015 | Ferko et al. | |
| 2016/0078361 A1 | 3/2016 | Brueckner et al. | |
| 2016/0103908 A1 | 4/2016 | Fletcher et al. | |
| 2016/0224532 A1 | 8/2016 | Miller et al. | |
| 2016/0224616 A1* | 8/2016 | Beacom | G06F 16/248 |
| 2016/0232207 A1 | 8/2016 | Brunel et al. | |
| 2016/0314605 A1 | 10/2016 | Filippi et al. | |
| 2017/0010787 A1 | 1/2017 | Ranganathan et al. | |
| 2017/0075557 A1 | 3/2017 | Noble et al. | |
| 2017/0091317 A1 | 3/2017 | Cummings et al. | |
| 2017/0102694 A1 | 4/2017 | Enver et al. | |
| 2017/0103103 A1 | 4/2017 | Nixon et al. | |
| 2017/0140068 A1 | 5/2017 | Oh et al. | |
| 2017/0154088 A1 | 6/2017 | Sherman | |
| 2017/0161188 A1 | 6/2017 | Isoi | |
| 2017/0177681 A1 | 6/2017 | Potiagalov et al. | |
| 2017/0177744 A1 | 6/2017 | Potiagalov et al. | |
| 2017/0178368 A1 | 6/2017 | Noon et al. | |
| 2017/0193049 A1 | 7/2017 | Grehant | |
| 2017/0213131 A1 | 7/2017 | Hammond et al. | |
| 2017/0220633 A1 | 8/2017 | Porath et al. | |
| 2017/0286526 A1 | 10/2017 | Bar-Or et al. | |
| 2017/0293666 A1 | 10/2017 | Ragavan et al. | |
| 2017/0316355 A1 | 11/2017 | Shrestha et al. | |
| 2018/0024731 A1 | 1/2018 | Sanches et al. | |
| 2018/0067998 A1* | 3/2018 | Sherman | G06F 16/248 |
| 2018/0129369 A1 | 5/2018 | Kim et al. | |
| 2018/0157702 A1 | 6/2018 | Clemens et al. | |
| 2018/0218050 A1 | 8/2018 | Porath et al. | |
| 2018/0260106 A1 | 9/2018 | Leonard et al. | |
| 2018/0260903 A1 | 9/2018 | Callery | |
| 2018/0283886 A1* | 10/2018 | Mas-Ud Hussain | G01C 21/3415 |
| 2019/0034489 A1 | 1/2019 | Ziegler | |
| 2019/0095395 A1 | 3/2019 | Piecko | |
| 2019/0188308 A1 | 6/2019 | Simon et al. | |
| 2019/0227777 A1* | 7/2019 | ChoFleming, Jr. | G06F 8/34 |
| 2019/0251123 A1* | 8/2019 | Yamane | G06F 16/285 |
| 2019/0286668 A1 | 9/2019 | Puzicha et al. | |
| 2019/0294720 A1 | 9/2019 | Beringer et al. | |
| 2019/0325292 A1 | 10/2019 | Remis et al. | |
| 2019/0332599 A1* | 10/2019 | Woo | G06F 16/248 |
| 2019/0384836 A1 | 12/2019 | Roth et al. | |
| 2020/0104401 A1 | 4/2020 | Burnett et al. | |
| 2020/0104402 A1 | 4/2020 | Burnett et al. | |
| 2020/0175006 A1* | 6/2020 | Hughes | G05B 13/048 |
| 2020/0285803 A1 | 9/2020 | Edge et al. | |
| 2020/0334277 A1* | 10/2020 | Doyle | G06F 16/211 |
| 2020/0372057 A1 | 11/2020 | Tonkin et al. | |
| 2020/0401623 A1* | 12/2020 | Dilts | G06F 16/9024 |
| 2021/0042298 A1* | 2/2021 | Yamane | G06F 16/9024 |
| 2021/0141831 A1* | 5/2021 | Sherman | C12C 11/06 |
| 2021/0192371 A1* | 6/2021 | Tago | G06N 20/00 |
| 2021/0263900 A1 | 8/2021 | Joyce et al. | |
| 2021/0365248 A1* | 11/2021 | ChoFleming, Jr. | G06F 9/4494 |
| 2021/0390420 A1* | 12/2021 | Barnett | G06N 5/02 |
| 2022/0113150 A1* | 4/2022 | Hidayat | G01C 21/3461 |
| 2023/0008999 A1* | 1/2023 | Beers | G06F 16/2282 |
| 2023/0059083 A1* | 2/2023 | Verma | G06F 16/248 |
| 2023/0065227 A1* | 3/2023 | Verma | G06F 16/2246 |
| 2024/0111791 A1* | 4/2024 | Verma | G06F 16/248 |

OTHER PUBLICATIONS

Lyons, Bethany, Relationships: Data modeling in Tableau Tabelua.com, May 11, 2020 (Year: 2020).*

Papagelis, Manos, Refining Social Graph Connectivity via Shortcut Edge Addition ACM Trans. Knowl. Discov. Data 10, 2, Article 12, Oct. 2015 (Year: 2015).*

Office Communication for U.S. Appl. No. 17/535,465 mailed Jun. 8, 2023, pp. 1-7.

Office Communication for U.S. Appl. No. 17/409,299 mailed Jun. 28, 2023, pp. 1-36.

Office Communication for U.S. Appl. No. 17/091,536 mailed Jul. 24, 2023, pp. 1-7.

Office Communication for U.S. Appl. No. 17/542,148 mailed Feb. 28, 2023, pp. 1-2.

Office Communication for U.S. Appl. No. 17/091,536 mailed Mar. 10, 2023, pp. 1-10.

Office Communication for U.S. Appl. No. 17/091,536 mailed Mar. 16, 2023, pp. 1-3.

Office Communication for U.S. Appl. No. 17/370,367 mailed Apr. 6, 2023, pp. 1-4.

Office Communication for U.S. Appl. No. 17/370,367 mailed May 24, 2023, pp. 1-18.

Pienta, Robert et al., "VISAGE: Interactive Visual Graph Querying," AVI '16, Jun. 7-10, 2016, Bari Italy, pp. 272-279.

Von Landesberger, Tatiana et al., "A System for Interactive Visual Analysis of Large Graphs Using Motifs in Graph Editing and Aggregation," VMV 2009, pp. 1-9.

Office Communication for U.S. Appl. No. 16/586,554 mailed Jul. 24, 2020, pp. 1-27.

Office Communication for U.S. Appl. No. 16/586,554 mailed Nov. 24, 2020, pp. 1-28.

Office Communication for U.S. Appl. No. 16/586,554 mailed Feb. 16, 2021, pp. 1-7.

Office Communication for U.S. Appl. No. 16/586,554 mailed Apr. 2, 2021, pp. 1-37.

Office Communication for U.S. Appl. No. 16/725,986 mailed Apr. 2, 2021, pp. 1-23.

(56) References Cited

OTHER PUBLICATIONS

Papenbrock, Thorsten et al., "Data-driven Schema Normalization," in Proceedings of the 20th International Conference on Extending Database Technology, 2017, pp. 342-353.
Brunel, Robert et al., "Supporting Hierarchical Data in SAP HANA," 2015 IEEE 31st International Conference on Data Engineering (ICDE), 2015, pp. 1-12.
Office Communication for U.S. Appl. No. 16/984,014 mailed Aug. 10, 2021, pp. 1-32.
Furmanova, Katarina et al., "Taggle: Scalable Visualization of Tabular Data through Aggregation," IEEE Transactions on Visualization and Computer Graphics, 2017, pp. 1-14.
Office Communication for U.S. Appl. No. 16/586,554 mailed Sep. 27, 2021, pp. 1-45.
Office Communication for U.S. Appl. No. 16/725,986 mailed Sep. 30, 2021, pp. 1-10.
Office Communication for U.S. Appl. No. 17/091,536 mailed Nov. 5, 2021, pp. 1-25.
Office Communication for U.S. Appl. No. 16/944,043 mailed Nov. 26, 2021, pp. 1-49.
Office Communication for U.S. Appl. No. 16/586,554 mailed Dec. 15, 2021, pp. 1-7.
Office Communication for U.S. Appl. No. 16/984,014 mailed Jan. 3, 2022, pp. 1-31.
Office Communication for U.S. Appl. No. 16/586,554 mailed Feb. 24, 2022, pp. 1-47.
Office Communication for U.S. Appl. No. 16/984,014 mailed Mar. 18, 2022, pp. 1-5.
Office Communication for U.S. Appl. No. 16/944,043 mailed Apr. 19, 2022, pp. 1-10.
Office Communication for U.S. Appl. No. 16/984,014 mailed Apr. 20, 2022, pp. 1-33.
Office Communication for U.S. Appl. No. 17/091,536 mailed Apr. 25, 2022, pp. 1-32.
Office Communication for U.S. Appl. No. 17/091,536 mailed Jul. 7, 2022, pp. 1-5.
Office Communication for U.S. Appl. No. 17/091,536 mailed Aug. 16, 2022, pp. 1-38.
Gillis, Alexander S. et al., "What is integrated development environment (IDE)?—Definition from WhatIs.com," Sep. 2018, TechTarget, https://www.techtarget.com/searchsoftwarequality/definition/integrated-development-environment, Accessed: Aug. 16, 2022, pp. 1-4.
Office Communication for U.S. Appl. No. 16/586,554 mailed Aug. 17, 2022, pp. 1-56.
Office Communication for U.S. Appl. No. 17/370,367 mailed Sep. 1, 2022, pp. 1-13.
International Search Report and Written Opinion for International Patent Application No. PCT/US2022/034283 mailed Oct. 27, 2022, pp. 1-12.
Office Communication for U.S. Appl. No. 16/586,554 mailed Nov. 21, 2022, pp. 1-6.
Office Communication for U.S. Appl. No. 16/586,554 mailed Jan. 5, 2023, pp. 1-24.
Office Communication for U.S. Appl. No. 17/370,367 mailed Jan. 27, 2023, pp. 1-14.
International Search Report and Written Opinion for International Patent Application No. PCT/US2020/028163 mailed Jul. 21, 2020, pp. 1-7.
Office Communication for U.S. Appl. No. 16/389,389 mailed May 13, 2021, pp. 1-16.
Office Communication for U.S. Appl. No. 16/389,389 mailed Aug. 18, 2021, pp. 1-9.
International Search Report and Written Opinion for International Patent Application No. PCT/US2022/031195 mailed Aug. 31, 2022, pp. 1-12.
Office Communication for U.S. Appl. No. 17/542,148 mailed Oct. 27, 2022, pp. 1-14.
International Search Report and Written Opinion for International Patent Application No. PCT/US2022/038328 mailed Nov. 30, 2022, pp. 1-12.
Office Communication for U.S. Appl. No. 17/409,299 mailed Feb. 14, 2023, pp. 1-28.
Bauer, Reinhard et al., "The Shortcut Problem—Complexity and Algorithms," Journal of Graph Algorithms and Applications, Aug. 2012, vol. 16, No. 2, pp. 447-481.
Hesse, William, "Directed Graphs Requiring Large Numbers of Shortcuts," in Proceedings of the Fourteenth Annual ACM-SIAM Symposium on Discrete Algorithms, Jan. 2003, pp. 665-669.
Office Communication for U.S. Appl. No. 17/542, 148 mailed Feb. 17, 2023, pp. 1-8.

* cited by examiner

# DETERMINING SHORTCUT RELATIONSHIPS IN DATA MODELS

TECHNICAL FIELD

The present invention relates generally to data management, and more particularly, but not exclusively, to determining shortcut relationships in data models.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases, the quantity of data may make it difficult to effectively utilize the collected data to improve business practices. Accordingly, in some cases, organizations may employ various applications or tools to generate data models based on some or all of their data. Such data models may be used to generate visualizations, reports, or the like, that may improve their understanding of business operations, sales, customer information, employee information, key performance indicators, or the like. In some cases, sophisticated data models may be represented as graphs with vertexes representing entities and edges representing relationships. In some cases, graph based data models for some organizations may be large or complex such that naively maintaining, editing, updating, some data models may consume a disadvantages amount of compute resources or otherwise impact system responsiveness. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF THE VARIOUS EMBODIMENTS

Figure 1A:
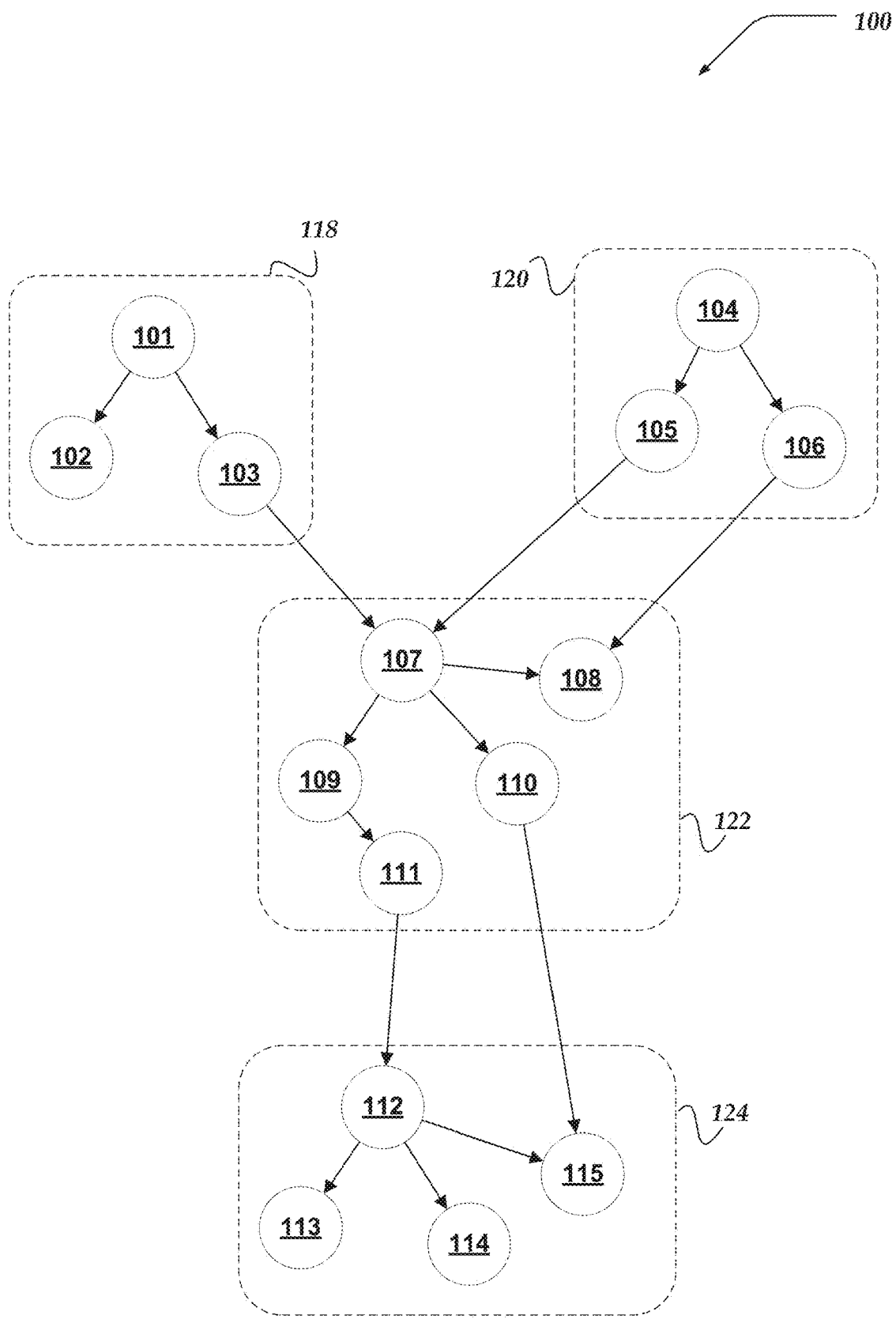
FIG. 1A illustrates a logical schematic of a data model for determining shortcut relationships in data models in accordance with one or more of the various embodiments.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein, the term, "engine" refers to logic embodied in hardware or software instructions, which can be written in a programming language, such as C, C++, Objective-C, COBOL, Java™, Kotlin, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine. Also, in some embodiments, one or more portions of an engine may be a hardware device, ASIC, FPGA, or the like, that performs one or more actions in the support of an engine or as part of the engine.

As used herein, the term "data model" refers to one or more data structures that represent one or more entities associated with data collected or maintained by an organization. Data models are typically arranged to model various operations or activities associated with an organization. In some cases, data models are arranged to provide or facilitate various data-focused actions, such as, efficient storage, queries, indexing, search, updates, or the like. Generally, a data model may be arranged to provide features related to data manipulation or data management rather than providing an easy to understand presentation or visualizations of the data.

As used herein, the term "data object" refers to one or more entities or data structures that comprise data models. In some cases, data objects may be considered portions of the data model. Data objects may represent various classes or kinds of items, such as, databases, data-sources, tables, workbooks, visualizations, workflows, or the like.

As used herein, the term "data type" refers to a data object that represents a class or kind of data object. For example, Table and Column may each be data types while Table A and Column B of Table A may be considered instances of data type Table and data type Column respectively.

As used herein, the terms "shortcut," or "shortcut edge" refer to declared directed paths in a schema model that extends from a source data type node to a target data type node. Shortcut definitions may include at least a source data type, a target data type, and a path direction. Thus, a fully realized shortcut is a path in the data model from a source data node to a target data node.

As used herein, the term "graphlet" refers to a portion of a data model that may correspond to a particular collection of data objects that a data designer has declared to be related or associated in one or more ways. For example, a first graphlet may represent data objects and relationships associated with customers while a second graphlet may data objects and relationships associated with invoices. In some cases, it may be useful to organize data models by grouping one or more relevant data objects or relationships into graphlets. The nodes and edges associated with different graphlets may be included in the same data model. The number of nodes/edges included in a graphlet may vary depending on the kind of data represented by the graphlet. The complexity (e.g., numbers of nodes or edges) of a graphlet may also vary depending on the needs of the data designer or the kind of data represented by the graphlet.

As used herein, the term "critical edge" refers to an edge in a data model that spans two graphlets. Accordingly, critical edges have one vertex node in a first graphlet and another vertex node in a second graphlet or otherwise exterior to the first graphlet. In contrast, non-critical edges are edges that are associated with nodes that may be exclusively included in the same graphlet or edges exclusively associated with nodes exterior to the graphlet under consideration.

As used herein, the term "shortcut specification" refers to data structures that include rules, instructions, constraints, matching models, or the like, for determining if a shortcut may be generated between nodes. Shortcut specifications may include rules or patterns that evaluate data objects, relationships, data types, edge types, path distances, or the like, such that if a data model portion matches a shortcut specification, a shortcut may be provided and associated with a data model.

As used herein, the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data using network computers. In one or more of the various embodiments, a data model that includes a plurality of data objects, a plurality of data relationships, and a plurality of shortcuts may be displayed in a user interface such that each data object may be represented by a node in the data model and each data relationship may be represented by at least one edge in the data model.

In response to one or more portions of the data model being selected in the user interface for removal from the data model further actions may be performed, including: determining a plurality of edges and a plurality of nodes associated with the portion of the data model based on the data model; determining one or more critical edges from the plurality of edges based on the data model such that each critical edge may be associated with one or more nodes included in the portion of the data model and one or more other nodes that are exterior to the portion of the data model; traversing the data model based on the one or more critical edges; determining one or more critical shortcuts based on the traversal and one or more shortcut specifications that may match the one or more critical shortcuts such that the one or more critical shortcuts may be associated with at least one critical edge; modifying the data model by deleting each critical shortcut unmatched to the one or more shortcut specifications and deleting the one or more selected portions of the data model along with the associated plurality of nodes and edges; or the like.

In one or more of the various embodiments, one or more undeleted portions of the modified data model may be displayed in the user interface.

In one or more of the various embodiments, determining the one or more critical shortcuts, may include comparing one or more portions of the data model to the one or more shortcut specifications such that the comparison may evaluate one or more a data type of a node, a relationship type of an edge, a length of a path between two nodes, or the like. And, in some embodiments, the one or more matched shortcut specifications may be determined based on the comparison.

In one or more of the various embodiments, the one or more selected portions of the data model may include one or more graphlets that include the plurality of nodes.

In one or more of the various embodiments, the one or more shortcut specifications may be provided such that the one or more shortcut specifications may declare one or more criteria for generating shortcuts in the data model. In some embodiments, the criteria may include one or more of a path length, a node type, a data types, an edge type, or the like.

In one or more of the various embodiments, determining the one or more critical shortcuts based on the traversal may include: determining one or more new shortcuts based on the one or more matched shortcut specifications; including the one or more new shortcuts in the data model; or the like.

In one or more of the various embodiments, determining the one or more critical edges may include: determining a flow direction associated with each of the plurality of edges; determining the one or more critical edges based on the flow direction associated with the portion of the one or more edges such that each critical edge may be associated with an edge that may be directed into the portion of the data model and another edge directed away from the portion of the data model.

In one or more of the various embodiments, a user may be enabled to select the one or more portions of the data model in the user interface. In some embodiments, the one or more selected portions of the data model may be determined in the user interface based on user interaction.

Illustrative Logical System Architecture

FIG. 1A illustrates a logical schematic of data model 100 for determining shortcut relationships in data models in accordance with one or more of the various embodiments.

In some embodiments, data management engines may be arranged to provide data models that represent data objects using graphs or graph-like data structures. In one or more of the various embodiments, data models may logically represent data objects as nodes in a graph and relationships between data objects as edges in the graph. In one or more of the various embodiments, organizations or applications may design or declare particular data models for particular problem domains, subject matter, business operations, or the like. For example, an organization may design a data model to represent a customer service system such that it may model users, products, customers, complaints/issues, solutions, or the like. While, for example, another organization may design a data model to represent other problem domains with different entities or different relationships. Accordingly, data model 100 may be considered to represent a 'generic' data model. One of ordinary skill in the art will appreciate that particular data models in production environments will be tailored to the unique needs of the organizations developing/using such data models.

Further, in some cases, in some embodiments, data models used by large enterprises may be very complex with 1000's of nodes or 1000's of edges. Accordingly, in some cases, a data model may have portions of the data model grouped or associated into graphlets. In this context, a graphlet may represent a grouping or collection of related nodes or edges/relationships. Employing graphlets may enable organizations to organize data models into more management data models. For example, an organization may encapsulate some features/objects by using graphlets.

Also, in some embodiments, data models may be considered to comprised of graphlets that may be integrated together based on relationships (edges) that represent the relationships between the various graphlets within the context of the data model as a whole.

Accordingly, in this example, for some embodiments, data model 100 may comprise nodes 101-115 grouped into graphlet 118, graphlet 120, graphlet 122, graphlet 124. The graphlets are illustrated with dashed lines to represent the nodes or edges that are included in a particular graphlet.

One of ordinary skill in the art will appreciate data structures, such as, data structure 100 may be represented using various implementations, such as, JSON, XML, structures, objects, database tables, or the like, without departing from the scope of these innovations.

Figure 1B:
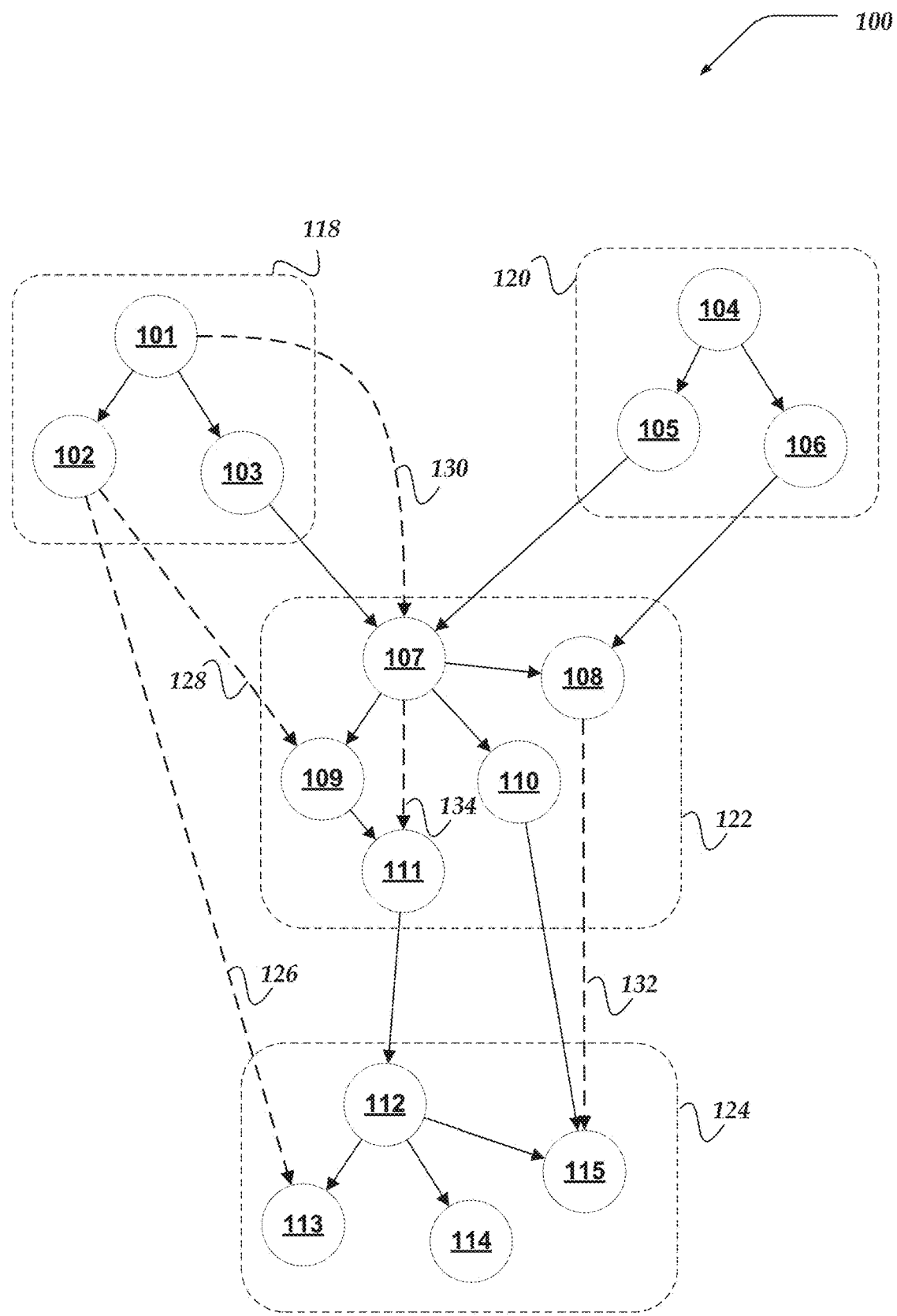
FIG. 1B illustrates a logical schematic of a data model for determining shortcut relationships in data models in accordance with one or more of the various embodiments.

FIG. 1B illustrates a logical schematic of data model 100 for determining shortcut relationships in data models in accordance with one or more of the various embodiments. In some embodiments, data management engines may be arranged to support shortcut features that enable shortcut edges to link nodes in data model. In some embodiments, shortcut edges may provide paths that link nodes such that the paths may be more direct or efficient than the paths provided by the native edges or nodes in the data model. In some embodiments, shortcuts may enable data management engines to reduce the time/resources required to navigate/traverse between nodes. For example, a native path between node 102 and node 113 may be determined absent shortcut edges. However, shortcut edge 126 provides a direct single-hop path between node 102 and node 113. Accordingly, in some embodiments, shortcuts may be used to optimize performance of data management engine by introducing more efficient paths between critical nodes/objects in data models.

For example, in some embodiments, data management engines may be arranged to provide user interfaces that enable users/administrators to declare/define shortcut edges. Also, in some embodiments, data management engines may be arranged to employ one or more automated mechanisms for declaring/defining shortcut edges.

In this example, data model 100 represents a data model that has shortcut edges that include shortcut edge 126, shortcut edge 128, shortcut edge 130, shortcut edge 132, and shortcut edge 134. Further, as shown here, shortcuts, such as, shortcut edge 134 may link nodes within a graphlet. Or, in some embodiments, shortcuts such as shortcut edge 126, shortcut edge 128, shortcut edge 130, or shortcut edge 132 across graphlets.

In some cases, as shown in examples above, shortcuts may be assumed to be more or less arbitrarily located in the data model. For example, data management engines may be arranged to provide user interfaces that enable users or administrators to include shortcuts to a data model. Also, for example, in some embodiments, data management engines may be arranged to automatically include shortcuts that connect particular nodes to each other depending on the represented object types. For example, in some embodiments, a data management engine may apply one or more rules, instructions, classifiers, or the like, to automatically determine that two nodes should be connected by a shortcut edge. Also, for example, in some embodiments, data management engines may be arranged to collect metrics or telemetry information based on user or application interactions with a data model to identify where shortcuts may be included or proposed. Thus, in some embodiments, data management engine may be arranged to employ shortcut specifications that include rules, instructions, classifiers, path/length constraints, or the like, provided via configuration information to account for local requirements or local circumstances.

In one or more of the various embodiments, shortcuts may be included to enable efficient or rapid traversal from/between nodes connected by a shortcut edge.

In some embodiments, data management engines or shortcut searchers may be arranged to compare portions of data model with one or more shortcut specifications to determine if a shortcut between two nodes should be generated. Thus, in some embodiments, if new shortcut specifications are added to a data management system, data management engines may be arranged to evaluate the data model to determine if new shortcuts should be provided.

Likewise, in some embodiments, if graphlets are deleted or modified, existing shortcuts may be impacted. Accordingly, in some embodiments, data management engines may be arranged to evaluate the data model in view of its shortcut specifications to determine if existing shortcuts should be deleted or modified. Also, the data model may be evaluated to determine if new shortcuts may be added in view of the changed data model and shortcut specifications.

Figure 1C:
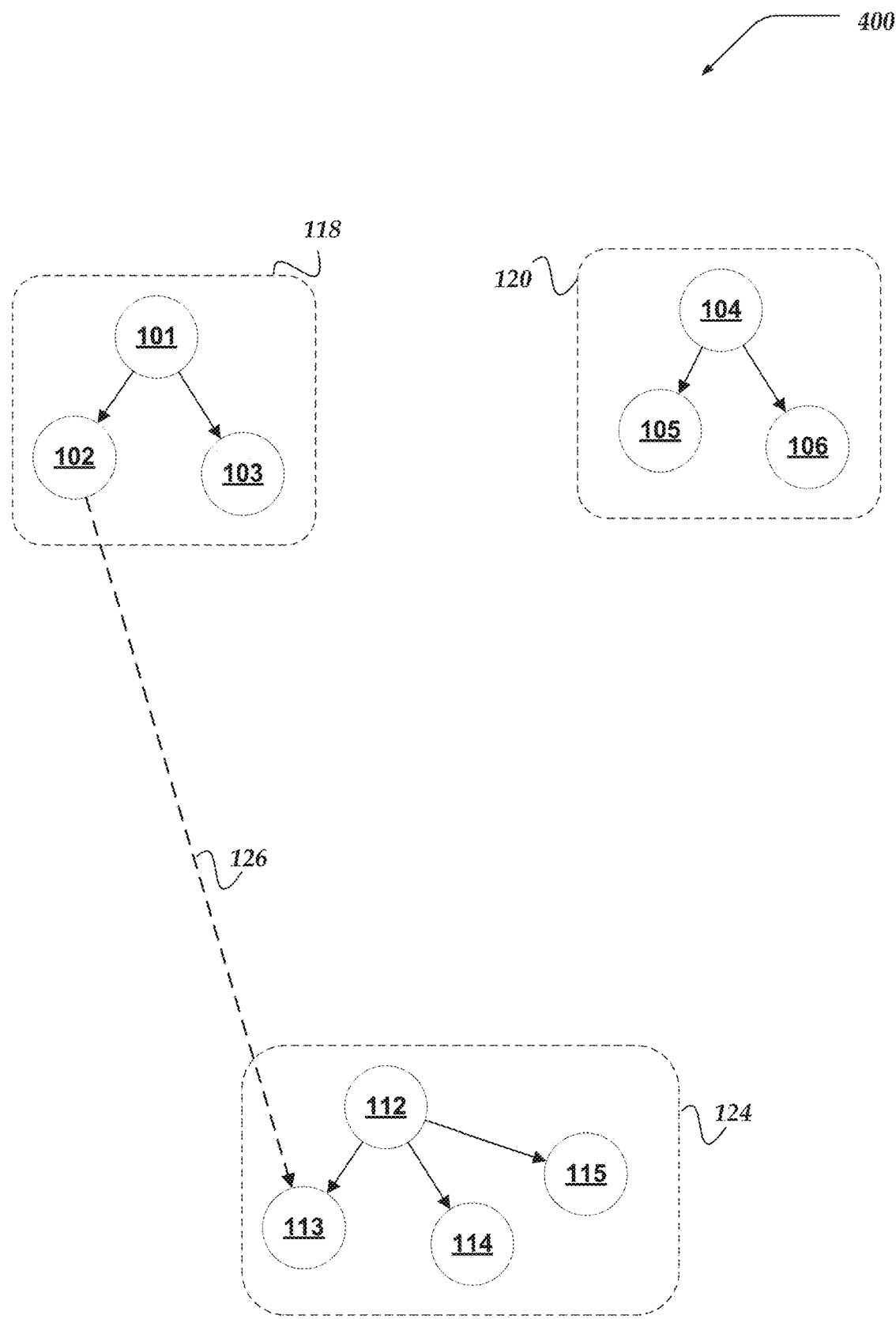
FIG. 1C illustrates a logical schematic of a data model for determining shortcut relationships in data models in accordance with one or more of the various embodiments.

FIG. 1C illustrates a logical schematic of data model 100 for determining shortcut relationships in data models in accordance with one or more of the various embodiments. In some embodiments, data management engines may be arranged to enable users/administrators to update or delete data models by updating or deleting graphlets that comprise the data model.

In this example, for some embodiments, data model 100 is shown with as it may appear with graphlet 122 (not shown in FIG. 1C) removed from data model 100.

Accordingly, in some embodiments, nodes and edges associated with the removed graphlets may be removed from the data model. Further, in some embodiments, data management engines may be arranged to remove shortcut edges that require nodes that have been removed. In this example, for some embodiments, shortcut edge 126 remains included in data model 100 while other shortcut edges. (E.g., shortcut edge 128, shortcut edge 130, shortcut edge 132, or shortcut edge 134 as shown in FIG. 1A.)

In one or more of the various embodiments, data management engines may be arranged to ensure that if nodes in a graphlet are removed from a data model associated shortcut edges (if any) remain valid, require removal, or require updating. Accordingly, in some embodiments, conventional data management engines may have been required to traverse the data model from each removed edge to determine the removed nodes may be associated with a shortcut. Because if a node associated with a shortcut edge may be removed, the associated shortcut may need to be removed depending on the shortcut specifications that may be associated with a data model.

In some embodiments, shortcut edges may appear (in FIG. 1B, or the like) to be edges that are inherently part of the data model. However, in practice, since shortcut edges may be arbitrarily included in the data model based on shortcut specifications, the data structures that represent shortcuts may be held separate from the graph model itself. Also, in some cases, for some embodiments, in different circumstances or different applications, data models that have the same graph representation may have different shortcuts because they may have different shortcut specifications.

In some embodiments, data management engines may be arranged to traverse the modified data model to determine if a shortcut may require deletion or modification in view of deleted/update nodes or graphlets and the shortcut specifications associated with the data model. However, in some cases, graphlets being removed may include hundreds or thousands of nodes or edges making a brute force traversal to identify shortcuts prohibitively costly in terms of computing resources, or time-to-completion. For example, traversing the data model and evaluating it in view of the shortcut specifications may result in redundant traversals or irrelevant evaluations in view of shortcut specifications.

Accordingly, in some embodiments, data management engines may be arranged to classify edges associated with graphlets selected for removal into different categories and determine which edges to traverse based on an edge's category.

In order to collect all the possible shortcuts that use deleted edges as their path connection, data management engines may be arranged to check the possible shortcut specifications to identify and calculate the potential shortcuts. However, conventionally data management engines may consider all the deleted edges which may be overwhelmingly resource intensive for the complex graphlets that may be encountered in production environments. For example, because in some cases, there may be many duplicated traversals when data management engines compute matching shortcuts for a given deleted node or data object.

In contrast, in some embodiments, limiting traversals to edges classified as critical edges may reduce the graph traversal effort by only computing matching shortcuts for these special edges.

Accordingly, in some embodiments, data management engines may be arranged to group the matching shortcuts into three categories where not every shortcut may be necessary to calculate and captured during the search for shortcuts.

In some embodiments, data management engines may be arranged to define a shortcut edge as $E\_s$ that connects the vertices/nodes $V\_i$ and $V\_j$. Thus, given a graphlet G, data management engines may categorize edges as follows:

$$Es: Vi > Vj, \text{ with } ViG \text{ and } VjG \qquad 1)$$

$$Es: Vi > Vj, \text{ with } Vi/G \text{ and } Vj/G \qquad 2)$$

$$Es: Vi > Vj, \text{ with } Vi/G \text{ and } VjG \text{ or } ViG \text{ and } Vj/G \qquad 3)$$

Thus, for category 1 and category 3, the shortcut edges are connected to at least one node that is inside the Graphlet. Because all the shortcuts are modeled as directed edges between the nodes, they will be always covered if the data management engines delete the nodes and edges of the graphlet. Accordingly, in some embodiments, shortcut searching may only be required for the category 2 shortcuts may be "crossing" the boundary of the graphlet. Accordingly, in some embodiments, critical edges may be defined as the direct edge connecting one node in the graphlet and one node outside the graphlet. Thus, the shortcut searching calculations may only need to consider the critical edges rather than all the edges included in the graphlet. In some embodiments, this optimization may dramatically reduce the duplicate traversals required for shortcut searching because many edges are eliminated from consideration. Thus, for complex data models with more than thousands of nodes, a large portion of such non-critical edges may be skipped to make the shortcut searching more efficient.

Figure 2:
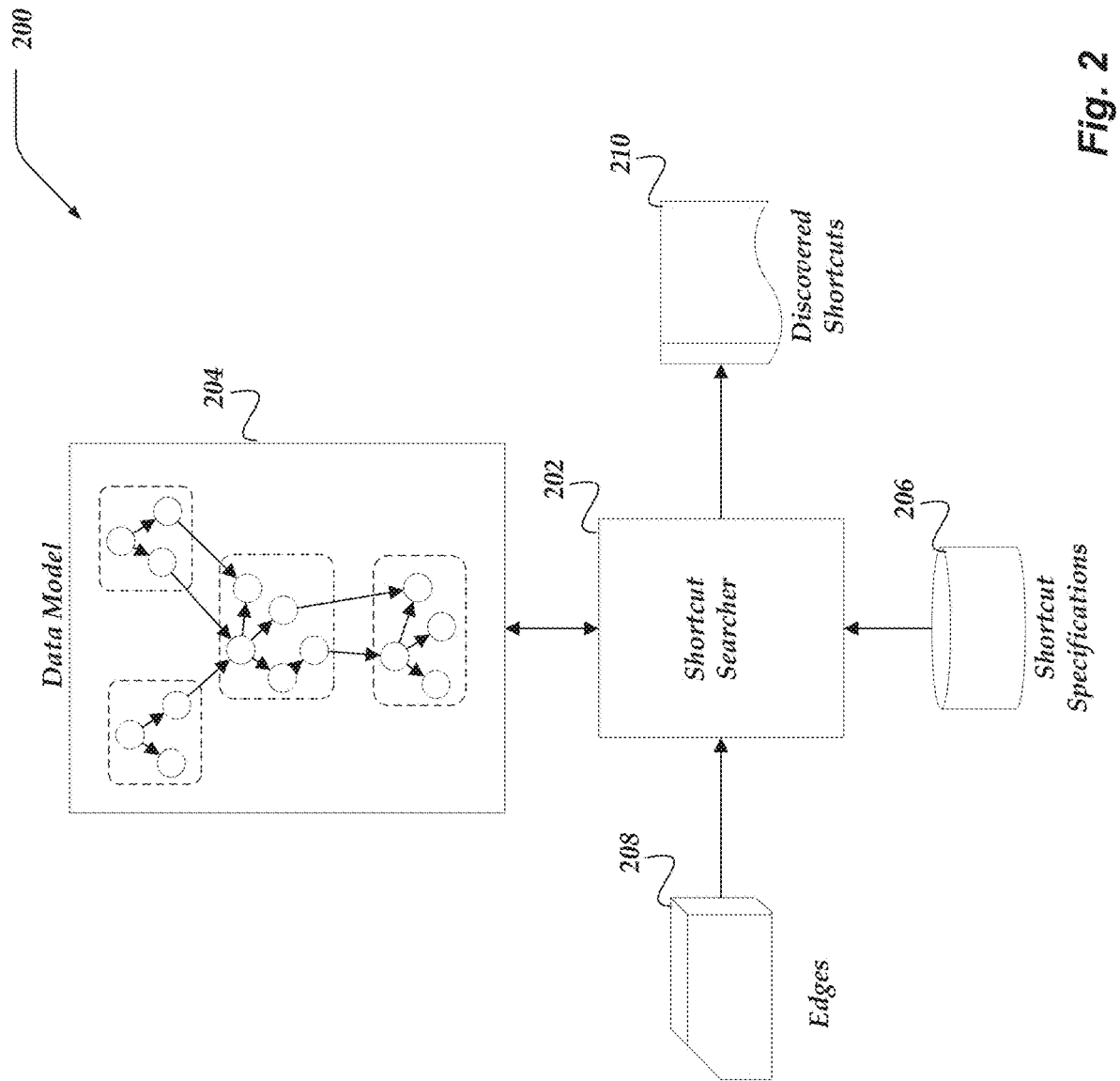
FIG. 2 illustrates a logical schematic of a system for determining shortcut relationships in data models in accordance with one or more of the various embodiments.

FIG. 2 illustrates a logical schematic of system 200 for determining shortcut relationships in data models in accordance with one or more of the various embodiments.

In one or more of the various embodiments, data management engines may be arranged to employ a shortcut searcher, such as, shortcut searcher 202 to identify one or more shortcuts that may be associated with one or more edges. Accordingly, in some embodiments, data management engines may be arranged to supply one or more edges from a data model (e.g., data model 204) to shortcut searcher 202. In some embodiments, shortcut searcher 202 may be arranged to traverse data model 204 to determine if one or more edges or paths in the data model correspond to one or more shortcuts.

In some embodiments, shortcut searchers may be arranged to employ a collection of shortcut specifications, such as, shortcut specifications 206. In one or more of the various embodiments, shortcut specifications may be data structures that include one or more rules, matching models, instructions, criteria, filters, or the like for determining if a shortcut is assigned or should be assigned to link two nodes in a data model.

In some cases, for some embodiments, shortcut specifications may be provided by user or administrators such that the provided shortcut specification may declare specific paths, nodes, data types, edges, edge-types, or the like, that may require a shortcut. For example, in some cases, for some embodiments, a shortcut specification may expressly declare a path though the data model that should be assigned a shortcut. Also, for example, another shortcut specification may provide a rule that requires a shortcut between node type A and node type B if there is a distance of two or more between the two nodes.

In some cases, shortcut searchers may be arranged to accept input data the provides starting points for traversals of the data model. In this example, edges 208 represents a collection of edges that a shortcut searcher may use to initiate shortcut searches. For example, if an arbitrary edge is provided to shortcut searcher 202, shortcut searcher 202 may traverse data model 204 starting from nodes at either end of the provided edge. As the traversal progresses, shortcut searcher may compare the traversal to the shortcut specifications to identify if a shortcut exists or should exist. In some embodiments, if the shortcut does not exist, the data management engine may generate the shortcut and associate it with the data model. Also, in some embodiments, if the shortcut already exists, the shortcut searcher may report the association of the input edge(s) and the shortcut. In production activity, in some embodiments, data management engines may use shortcuts to directly navigate between "shortcut" nodes rather than traversing the data model to navigate between them. Thus, in some embodiments, employing shortcuts may improve the performance of actions associated with nodes linked by shortcuts.

Note, in some embodiments, the criteria for associating shortcuts with two nodes may vary depending on the local requirements or local circumstances. For example, in some cases, shortcut specifications may be limited to declaring specific paths between nodes that should be associated with a shortcut edge. Also, for example, in some cases, a shortcut specification may be collection of rules or other criteria that indicate that a shortcut should be added. Accordingly, in some embodiments, shortcut searchers may be adapted to interpreting different types of shortcut specifications. In some embodiments, shortcut searchers may import various libraries, plug-ins, scripts, or the like, from configuration information that may enable different types of shortcut specifications to be interpreted.

Generalized Operations

Figure 3:
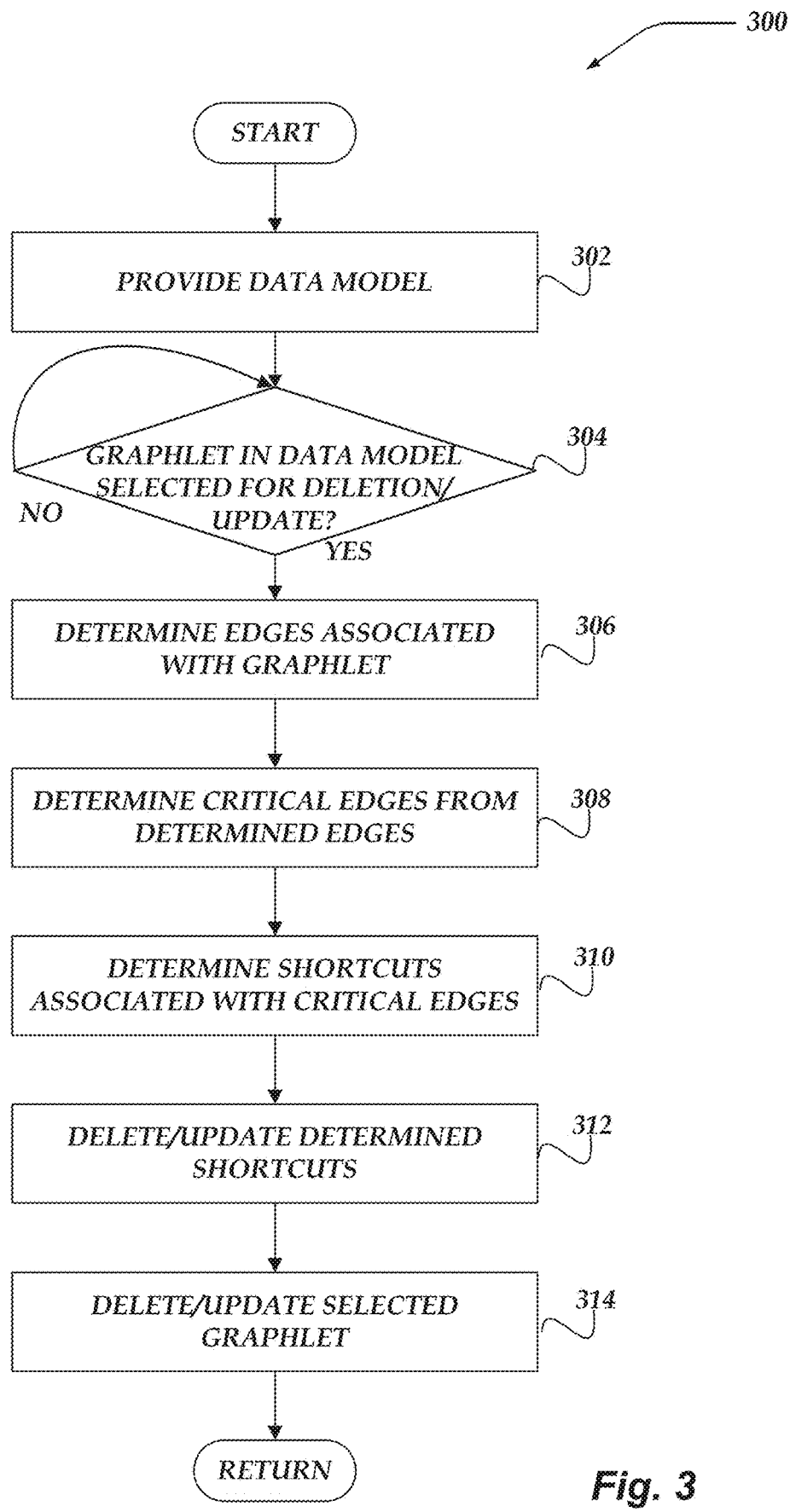
FIG. 3 illustrates an overview flowchart of a process for determining shortcut relationships in data models in accordance with one or more of the various embodiments.
Figure 4:
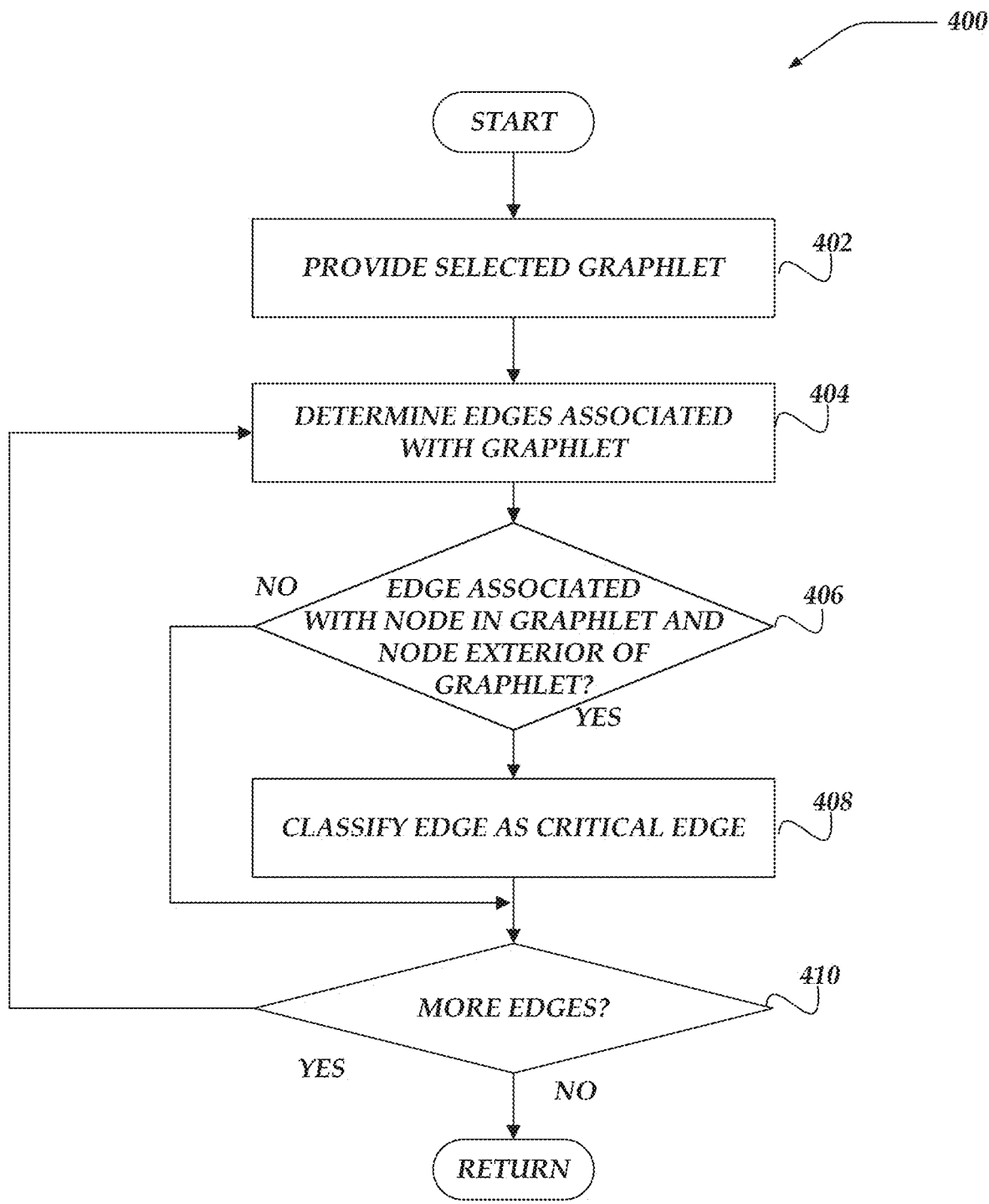
FIG. 4 illustrates a flowchart of a process for determining shortcut relationships in data models in accordance with one or more of the various embodiments.
Figure 5:
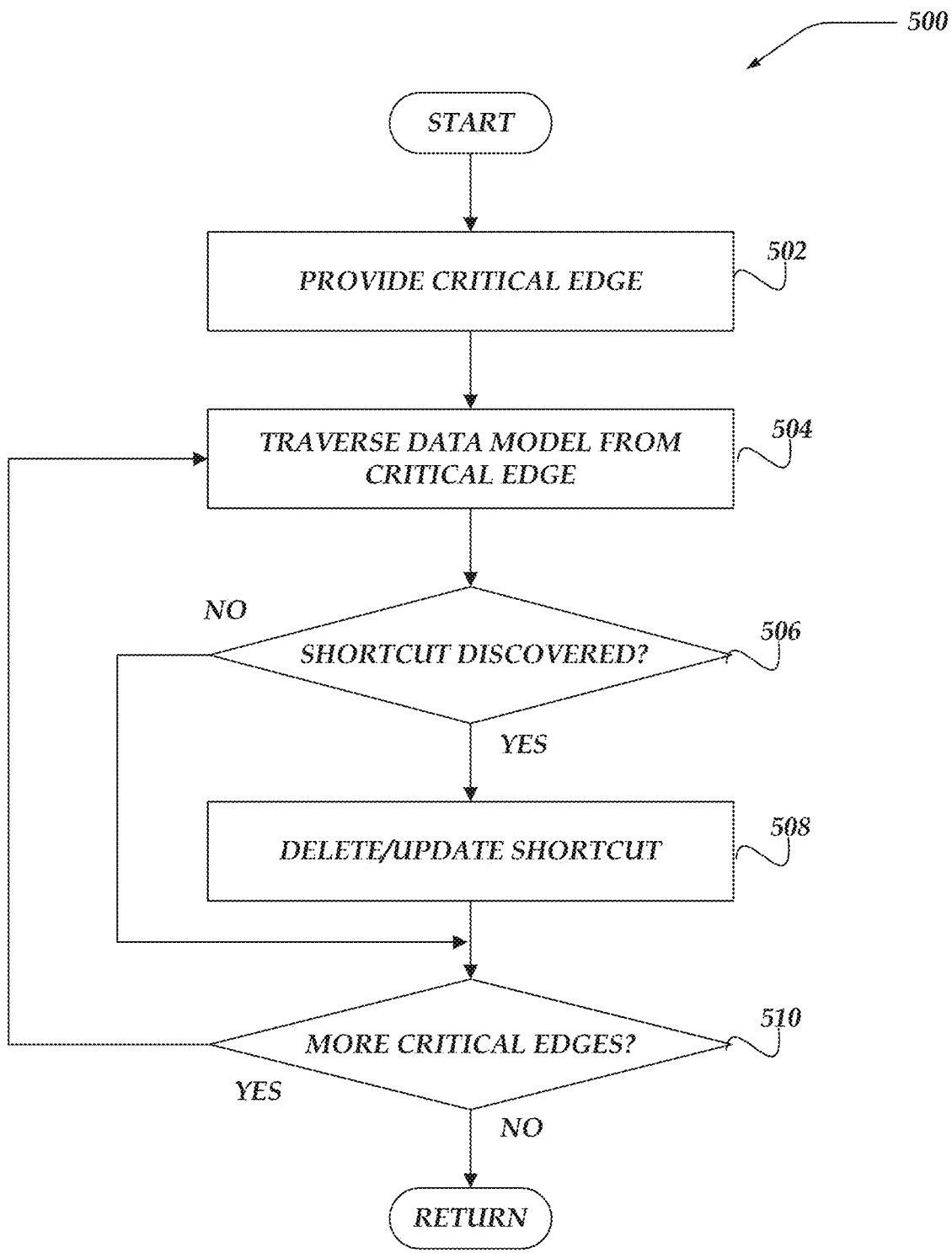
FIG. 5 illustrates a flowchart of a process for determining shortcut relationships in data models in accordance with one or more of the various embodiments.

FIGS. 3-5 represent generalized operations for determining shortcut relationships in data models in accordance with one or more of the various embodiments. In one or more of the various embodiments, processes 300, 400, and 500 described in conjunction with FIGS. 3-5 may be implemented by or executed by one or more processors on a single network computer, such as network computer 800 of FIG. 8. In other embodiments, these processes, or portions thereof, may be implemented by or executed on a plurality of network computers, such as network computer 800 of FIG. 8. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 3-5 may be used for determining shortcut relationships in data models in accordance with at least one of the various embodiments or architectures such as those described in conjunction with FIGS. 1A, 1B, IC, 1D, and 2. Further, in one or more of the various embodiments, some or all of the actions performed by processes 300, 400, and 500 may be executed in part by data management engine 822 or shortcut searcher 824 running on one or more processors of one or more network computers.

FIG. 3 illustrates an overview flowchart of process 300 for determining shortcut relationships in data models in accordance with one or more of the various embodiments. After a start block, at start block 302, in one or more of the various embodiments, a data model may be provided. As described above, a data model may be considered a graph or graph-like data structure arranged to represent data objects as nodes and relationships between nodes as edges.

At decision block 304, in one or more of the various embodiments, if a graphlet in the data model may be selected for deletion or update, control may flow to block 306; otherwise, control may loop back to the decision block 304. In one or more of the various embodiments, data management engine may be arranged to provide one or more user interfaces that enable users or administrators to select one or more portions of the data model. In some embodiments, selectable portions of the data model may be referred to as graphlets. In some embodiments, graphlets may be configured to encapsulate one or more related data objects or relationships between the one or more related data objects.

At block 306, in one or more of the various embodiments, data management engines may be arranged to determine one or more edges associated with the selected graphlet. In one or more of the various embodiments, data management engine may be arranged to perform one or more actions to identify edges associated with the selected graphlet. Note, in some embodiments, the particular actions performed by data management engines may vary depending on various features of the data model, including: the data structures used to represent the data model, the type of database used to store data models, or the like.

At block 308, in one or more of the various embodiments, data management engines may be arranged to determine one or more critical edges from the determined edges. In one or more of the various embodiments, critical edges may be considered the edges in the data model that may require traversal or other examination to determine if the deletion or updating of a graphlet may impact one or more shortcuts.

At block 310, in one or more of the various embodiments, data management engines may be arranged to determine one or more shortcuts that may be associated with the critical edges. As described above, data management engines may be arranged to employ shortcut searchers and shortcut specifications to determine if there may be one or more shortcuts associated with the graphlet being removed or updated. Briefly, in some embodiments, the data management engine may search the data model from the critical edges to determine if existing shortcuts may require modification or removal in view of the deletion or modification of the graphlet.

At block 312, in one or more of the various embodiments, data management engines may be arranged to delete or update the determined shortcuts. In one or more of the various embodiments, data management engine may identify one or more shortcuts that may no longer be viable or valid. Accordingly, in some embodiments, such shortcuts may be designated for deletion or modification. Also, in some embodiments, removing or updating the graphlet may enable or require new shortcuts to be generated depending on the shortcut specifications for the data model.

At block 314, in one or more of the various embodiments, data management engines may be arranged to delete or update the selected graphlet in the data model.

Next, in one or more of the various embodiments, control may be returned to a calling process.

FIG. 4 illustrates a flowchart of process 400 for determining shortcut relationships in data models in accordance with one or more of the various embodiments. After a start block, at start block 402, in one or more of the various embodiments, a selected graphlet may be provided. As described above, data management engines may be arranged to enable one or more portions of a data model to be selected for deletion, updating, or the like. In some embodiments, data management engines may provide user interfaces that enable users, administrators, or the like, to manually select a portion of the data model. In some embodiments, the selected portion may be considered a graphlet that includes one or more nodes, one or more edges, or the like.

At block 404, in one or more of the various embodiments, data management engines may be arranged to determine one or more edges associated with the graphlet. In one or more of the various embodiments, data management engine may be arranged to employ one or more actions to identify the edges that may be included in a graphlet.

In some embodiments, the particular mechanism for identifying the edges may vary depending on how the data model may be represented or stored. For example, if the data structures for the data model are stored in a database, the data management engine may be configured to execute a query that conforms to the database and data model data structures. Also, in some embodiments, if the data model may be stored in a graph-based database, the graph-based database may provide an API/query-language that enables the edges to be determined directly.

One of ordinary skill in the art will appreciate that data models may be implemented using a variety of data structures, databases, formats, or the like. Accordingly, in some embodiments, data management engines may be arranged to employ one or more plug-ins, libraries, query-strings, stored procedures, or the like, provided via configuration information to account for local requirements or local circumstances. For example, in some embodiments, if a particular database is selected for storing data model data structures, a library or plug-in may be declared in configuration information to provide support for APIs, query-languages, result set formats, field types (e.g., column types), or the like, for the particular database rather than restricting the data management engine to single type of database or a limited set of database interactions.

At decision block 406, in one or more of the various embodiments, if an edge may be associated with a node in the graphlet and another node exterior to the graphlet, control may flow to block 408; otherwise, control may flow to decision block 410. In some embodiments, data management engines may be arranged to evaluate the endpoints of each edge to determine the nodes at either end of the edge. Accordingly, in some embodiments, data management engines may be arranged to differentiate between edges that have both associated nodes inside the graphlet versus edges that have one node inside the graphlet boundary and one node exterior to the graphlet boundary.

At block 408, in one or more of the various embodiments, data management engines may be arranged to classify the edge as a critical edge. In one or more of the various embodiments, critical edges may be edges that may be associated with shortcuts that end or originate exterior to the graphlet. In some embodiments, the critical edges may be edges that the data management engine may be required to further examine to identify if there may be impacts to existing shortcuts by the deletion or updating of the graphlet.

At decision block 410, in one or more of the various embodiments, if there may be more edges, control may loop back to block 404; otherwise, control may be returned to a calling process. In one or more of the various embodiments, each edge associated with the selected graphlet may be evaluated. Accordingly, in some embodiments, data management engines may be arranged to continue classifying the edges until they each have been classified as critical or non-critical.

FIG. 5 illustrates a flowchart of process 500 for determining shortcut relationships in data models in accordance with one or more of the various embodiments. After a start block, at start block 502, in one or more of the various embodiments, a critical edge may be provided. As described above, data management engines may be arranged to classify edges associated with a graphlet that is selected for deletion or updating. Accordingly, in some embodiments, data management engines or shortcut searchers may be arranged to use the provided critical edge to determine where in the data model to begin searching for shortcuts.

At block 504, in one or more of the various embodiments, data management engines may be arranged to traverse the data model from the edge. In some embodiments, the traversal may collect nodes, edges, paths, path portions, or the like, that may be compared to shortcut specifications to determine if a shortcut exists (or should exist).

In one or more of the various embodiments, comparing the information collected during the traversal with shortcut specifications may be computationally expensive, thus performance improvement may be provided by limiting the search for shortcuts to critical edges.

At decision block 506, in one or more of the various embodiments, if a shortcut is discovered, control may flow to block 508; otherwise, control may flow to decision block 510.

In one or more of the various embodiments, as described above, data management engines may be arranged to evaluate the traversed portions of the data model with one or more shortcut specifications to determine if there may be a shortcut edge. In some cases, meta-data associated with visited nodes or traversed edges may include an indicator that a shortcut is associated with the visited nodes or traversed edges. Accordingly, in some embodiments, data management engine may be arranged to traverse the data model looking for node/edge indicated as being associated with shortcuts rather than matching with particular shortcut specifications.

In some cases, in some embodiments, data management engines may be arranged to employ shortcut specifications to update a shortcut. In some embodiments, if nodes or edges associated with a shortcut may be deleted, the corresponding shortcut specification may enable/require the shortcut to be updated rather than removed. Thus, in some embodiments, if a shortcut still meets its shortcut specification after a node is removed, the shortcut may remain. Though, in some embodiments, information associated with the shortcut, such as, its path through the data model, associated "internal" data model nodes, associated "internal" data model edges, or the like, may be updated to reflect the removed/deleted nodes or edges.

At block 508, in one or more of the various embodiments, data management engines may be arranged to delete or update the discovered shortcut. In one or more of the various embodiments, data management engines may be arranged to remove shortcuts that may be determined to be non-viable or otherwise invalid. These shortcuts may be shortcuts that no longer match a shortcut specification. In some cases, for some embodiments, the modification to the data model (e.g., deleting a graphlet) may invalidate a shortcut for one or more shortcut specifications while at the same time the modification may match a different shortcut specification. Thus, in some cases, a shortcut that is being removed may be replaced by a different shortcut that matches another shortcut specification.

Note, in some cases, the pending changes to the data model or changes to shortcut specifications may result in a new shortcut being added. For example, in some embodiments, deleting a graphlet from a data model may result in two shortcuts being removed and one shortcut being added depending on the data model, shortcut specifications, or the like.

At decision block 510, in one or more of the various embodiments, if there may be more critical edges, control may loop back to block 504; otherwise, control may be returned to a calling process. As described above, data management engine may determine one or more critical edges associated with the pending deletion. Accordingly, there may be more or fewer critical edges depending on the particular data model or the particular modification that is being applied the data model.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Illustrated Operating Environment

Figure 6:
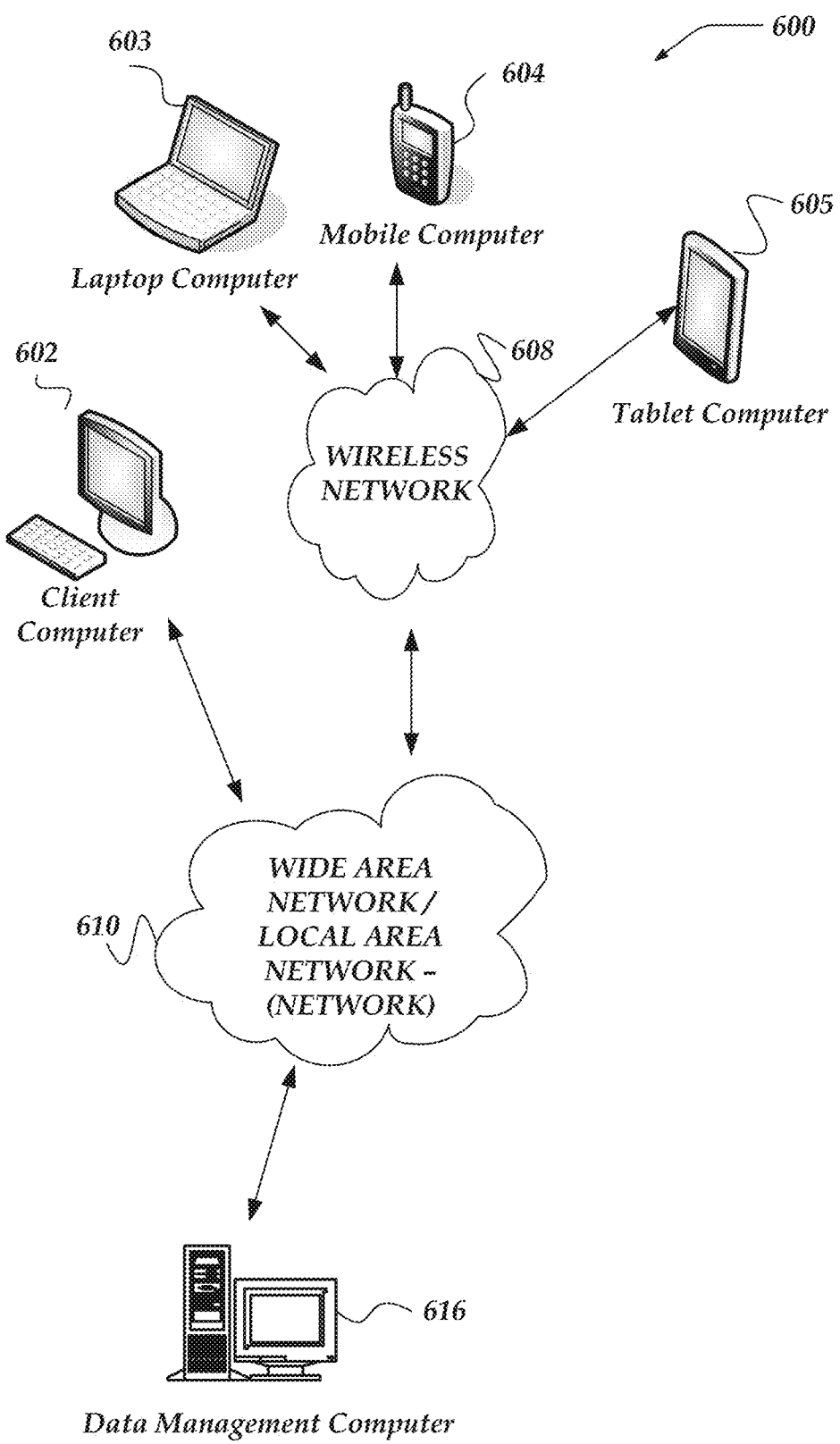
FIG. 6 shows components of one embodiment of an environment in which embodiments of the invention may be practiced.

FIG. 6 shows components of one embodiment of an environment in which embodiments of the invention may be practiced. Not all of the components may be required to practice the invention, and variations in the arrangement and type of the components may be made without departing from the spirit or scope of the invention. As shown, system 600 of FIG. 6 includes local area networks (LANs)/wide area networks (WANs)—(network) 610, wireless network 608, client computers 602-605, data management computer 616, or the like.

At least one embodiment of client computers 602-605 is described in more detail below in conjunction with FIG. 2. In one embodiment, at least some of client computers 602-605 may operate over one or more wired or wireless networks, such as networks 608, or 610. Generally, client computers 602-605 may include virtually any computer capable of communicating over a network to send and receive information, perform various online activities, offline actions, or the like. In one embodiment, one or more of client computers 602-605 may be configured to operate within a business or other entity to perform a variety of services for the business or other entity. For example, client computers 602-605 may be configured to operate as a web server, firewall, client application, media player, mobile telephone, game console, desktop computer, or the like. However, client computers 602-605 are not constrained to these services and may also be employed, for example, as for end-user computing in other embodiments. It should be recognized that more or less client computers (as shown in FIG. 6) may be included within a system such as described herein, and embodiments are therefore not constrained by the number or type of client computers employed.

Computers that may operate as client computer 602 may include computers that typically connect using a wired or wireless communications medium such as personal computers, multiprocessor systems, microprocessor-based or programmable electronic devices, network PCs, or the like. In some embodiments, client computers 602-605 may include virtually any portable computer capable of connecting to another computer and receiving information such as, laptop computer 603, mobile computer 604, tablet computers 605, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 602-605 typically range widely in terms of capabilities and features. Moreover, client computers 602-605 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 602-605 also may include at least one other client application that is configured to receive or send content between another computer. The client application may include a capability to send or receive content, or the like. The client application may further provide information that identifies itself, including a type, capability, name, and the like. In one embodiment, client computers 602-605 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, data management computer 616, or other computers.

Client computers 602-605 may further be configured to include a client application that enables an end-user to log into an end-user account that may be managed by another computer, such as data management computer 616, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by data management computer 616.

Wireless network 608 is configured to couple client computers 603-605 and its components with network 610. Wireless network 608 may include any of a variety of wireless sub-networks that may further overlay stand-alone ad-hoc networks, and the like, to provide an infrastructure-oriented connection for client computers 603-605. Such sub-networks may include mesh networks, Wireless LAN (WLAN) networks, cellular networks, and the like. In one embodiment, the system may include more than one wireless network.

Wireless network 608 may further include an autonomous system of terminals, gateways, routers, and the like connected by wireless radio links, and the like. These connectors may be configured to move freely and randomly and organize themselves arbitrarily, such that the topology of wireless network 608 may change rapidly.

Wireless network 608 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 603-605 with various degrees of mobility. In one non-limiting example, wireless network 608 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 608 may include virtually any wireless communication mechanism by which information may travel between client computers 603-605 and another computer, network, a cloud-based network, a cloud instance, or the like.

Network 660 is configured to couple network computers with other computers, including, data management computer 616, client computers 602, and client computers 603-605 through wireless network 608, or the like. Network 610 is enabled to employ any form of computer readable media for communicating information from one electronic device to another. Also, network 610 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 610 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of data management computer 616 is described in more detail below in conjunction with FIG. 8. Although FIG. 6 illustrates data management computer 616 as a single computer, the innovations or embodiments are not so limited. For example, one or more functions of data management computer 616, or the like, may be distributed across one or more distinct network computers. Moreover, in one or more embodiments, data management computer 616 may be implemented using a plurality of network computers. Further, in one or more of the various embodiments, data management computer 616, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 7:
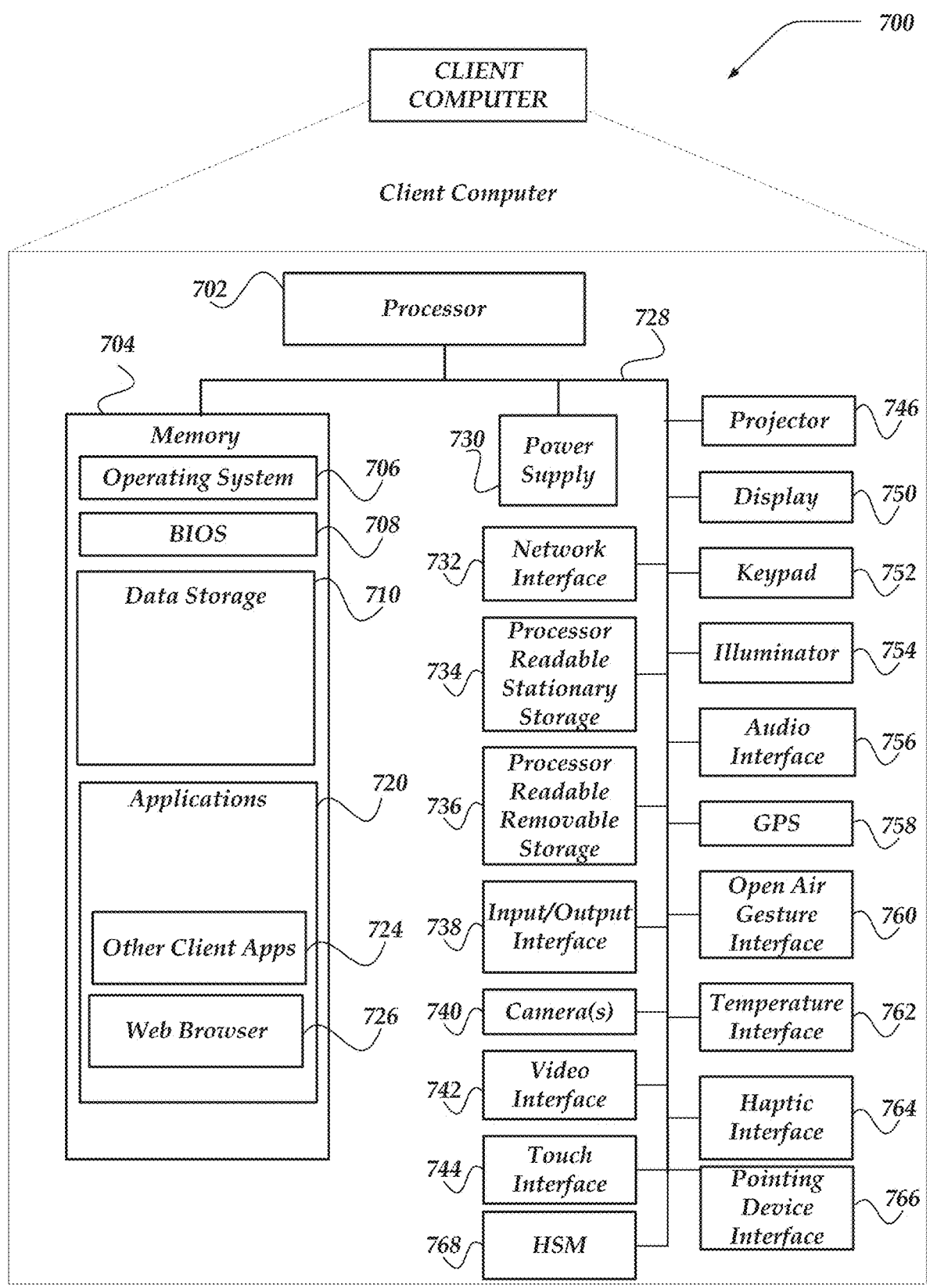
FIG. 7 shows one embodiment of a client computer that may include many more or less components than those shown.

FIG. 7 shows one embodiment of client computer 700 that may include many more or less components than those shown. Client computer 700 may represent, for example, one or more embodiments of mobile computers or client computers shown in FIG. 6.

Client computer 700 may include processor 702 in communication with memory 704 via bus 728. Client computer 700 may also include power supply 730, network interface 732, audio interface 756, display 750, keypad 752, illuminator 754, video interface 742, input/output interface 738, haptic interface 764, global positioning systems (GPS) receiver 758, open air gesture interface 760, temperature interface 762, camera(s) 740, projector 746, pointing device interface 766, processor-readable stationary storage device 734, and processor-readable removable storage device 736. Client computer 700 may optionally communicate with a base station (not shown), or directly with another computer. And in one embodiment, although not shown, a gyroscope may be employed within client computer 700 to measuring or maintaining an orientation of client computer 700.

Power supply 730 may provide power to client computer 700. A rechargeable or non-rechargeable battery may be used to provide power. The power may also be provided by an external power source, such as an AC adapter or a powered docking cradle that supplements or recharges the battery.

Network interface 732 includes circuitry for coupling client computer 700 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 732 is sometimes known as a transceiver, transceiving device, or network interface card (NIC).

Audio interface 756 may be arranged to produce and receive audio signals such as the sound of a human voice. For example, audio interface 756 may be coupled to a speaker and microphone (not shown) to enable telecommunication with others or generate an audio acknowledgment for some action. A microphone in audio interface 756 can also be used for input to or control of client computer 700, e.g., using voice recognition, detecting touch based on sound, and the like.

Display 750 may be a liquid crystal display (LCD), gas plasma, electronic ink, light emitting diode (LED), Organic LED (OLED) or any other type of light reflective or light transmissive display that can be used with a computer. Display 750 may also include a touch interface 744 arranged to receive input from an object such as a stylus or a digit from a human hand, and may use resistive, capacitive, surface acoustic wave (SAW), infrared, radar, or other technologies to sense touch or gestures.

Projector 746 may be a remote handheld projector or an integrated projector that is capable of projecting an image on a remote wall or any other reflective object such as a remote screen.

Video interface 742 may be arranged to capture video images, such as a still photo, a video segment, an infrared video, or the like. For example, video interface 742 may be coupled to a digital video camera, a web-camera, or the like. Video interface 742 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 752 may comprise any input device arranged to receive input from a user. For example, keypad 752 may include a push button numeric dial, or a keyboard. Keypad 752 may also include command buttons that are associated with selecting and sending images.

Illuminator 754 may provide a status indication or provide light. Illuminator 754 may remain active for specific periods of time or in response to event messages. For example, when illuminator 754 is active, it may backlight the buttons on keypad 752 and stay on while the client computer is powered. Also, illuminator 754 may backlight these buttons in various patterns when particular actions are performed, such as dialing another client computer. Illuminator 754 may also cause light sources positioned within a transparent or translucent case of the client computer to illuminate in response to actions.

Further, client computer 700 may also comprise hardware security module (HSM) 768 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 768 may be a stand-alone computer, in other cases, HSM 768 may be arranged as a hardware card that may be added to a client computer.

Client computer 700 may also comprise input/output interface 738 for communicating with external peripheral devices or other computers such as other client computers and network computers. The peripheral devices may include an audio headset, virtual reality headsets, display screen glasses, remote speaker system, remote speaker and microphone system, and the like. Input/output interface 738 can utilize one or more technologies, such as Universal Serial Bus (USB), Infrared, WiFi, WiMax, Bluetooth™, and the like.

Input/output interface 738 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 700.

Haptic interface 764 may be arranged to provide tactile feedback to a user of the client computer. For example, the haptic interface 764 may be employed to vibrate client computer 700 in a particular way when another user of a computer is calling. Temperature interface 762 may be used to provide a temperature measurement input or a temperature changing output to a user of client computer 700. Open air gesture interface 760 may sense physical gestures of a user of client computer 700, for example, by using single or stereo video cameras, radar, a gyroscopic sensor inside a computer held or worn by the user, or the like. Camera 740 may be used to track physical eye movements of a user of client computer 700.

GPS transceiver 758 can determine the physical coordinates of client computer 700 on the surface of the Earth, which typically outputs a location as latitude and longitude values. GPS transceiver 758 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 700 on the surface of the Earth. It is understood that under different conditions, GPS transceiver 758 can determine a physical location for client computer 700. In one or more embodiment, however, client computer 700 may, through other components, provide other information that may be employed to determine a physical location of the client computer, including for example, a Media Access Control (MAC) address, IP address, and the like.

In at least one of the various embodiments, applications, such as, operating system 706, other client apps 724, web browser 726, or the like, may be arranged to employ geo-location information to select one or more localization features, such as, time zones, languages, currencies, calendar formatting, or the like. Localization features may be used in documents, visualizations, display objects, display models, action objects, user-interfaces, reports, as well as internal processes or databases. In at least one of the various embodiments, geo-location information used for selecting localization information may be provided by GPS 758. Also, in some embodiments, geolocation information may include information provided using one or more geolocation protocols over the networks, such as, wireless network 608 or network 611.

Human interface components can be peripheral devices that are physically separate from client computer 700, allowing for remote input or output to client computer 700. For example, information routed as described here through human interface components such as display 750 or keyboard 752 can instead be routed through network interface 732 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 726 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 704 may include RAM, ROM, or other types of memory. Memory 704 illustrates an example of computer-readable storage media (devices) for storage of information such as computer-readable instructions, data structures, program modules or other data. Memory 704 may store BIOS 708 for controlling low-level operation of client computer 700. The memory may also store operating system 706 for controlling the operation of client computer 700. It will be appreciated that this component may include a general-purpose operating system such as a version of UNIX®, or Linux®, Microsoft Windows® or a specialized client computer communication operating system such as, Android™, or the Apple® Corporation's iOS. The operating system may include, or interface with a Java virtual machine module that enables control of hardware components or operating system operations via Java application programs.

Memory 704 may further include one or more data storage 710, which can be utilized by client computer 700 to store, among other things, applications 720 or other data. For example, data storage 710 may also be employed to store information that describes various capabilities of client computer 700. The information may then be provided to another device or computer based on any of a variety of methods, including being sent as part of a header during a communication, sent upon request, or the like. Data storage 710 may also be employed to store social networking information including address books, buddy lists, aliases, user profile information, or the like. Data storage 710 may further include program code, data, algorithms, and the like, for use by a processor, such as processor 702 to execute and perform actions. In one embodiment, at least some of data storage 710 might also be stored on another component of client computer 700, including, but not limited to, non-transitory processor-readable removable storage device 736, processor-readable stationary storage device 734, or even external to the client computer.

Applications 720 may include computer executable instructions which, when executed by client computer 700, transmit, receive, or otherwise process instructions and data. Applications 720 may include, for example, other client applications 724, web browser 726, or the like. Client computers may be arranged to exchange communications, such as, queries, searches, messages, notification messages, event messages, alerts, performance metrics, log data, API calls, or the like, combination thereof, with data management computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 700 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 600 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 8:
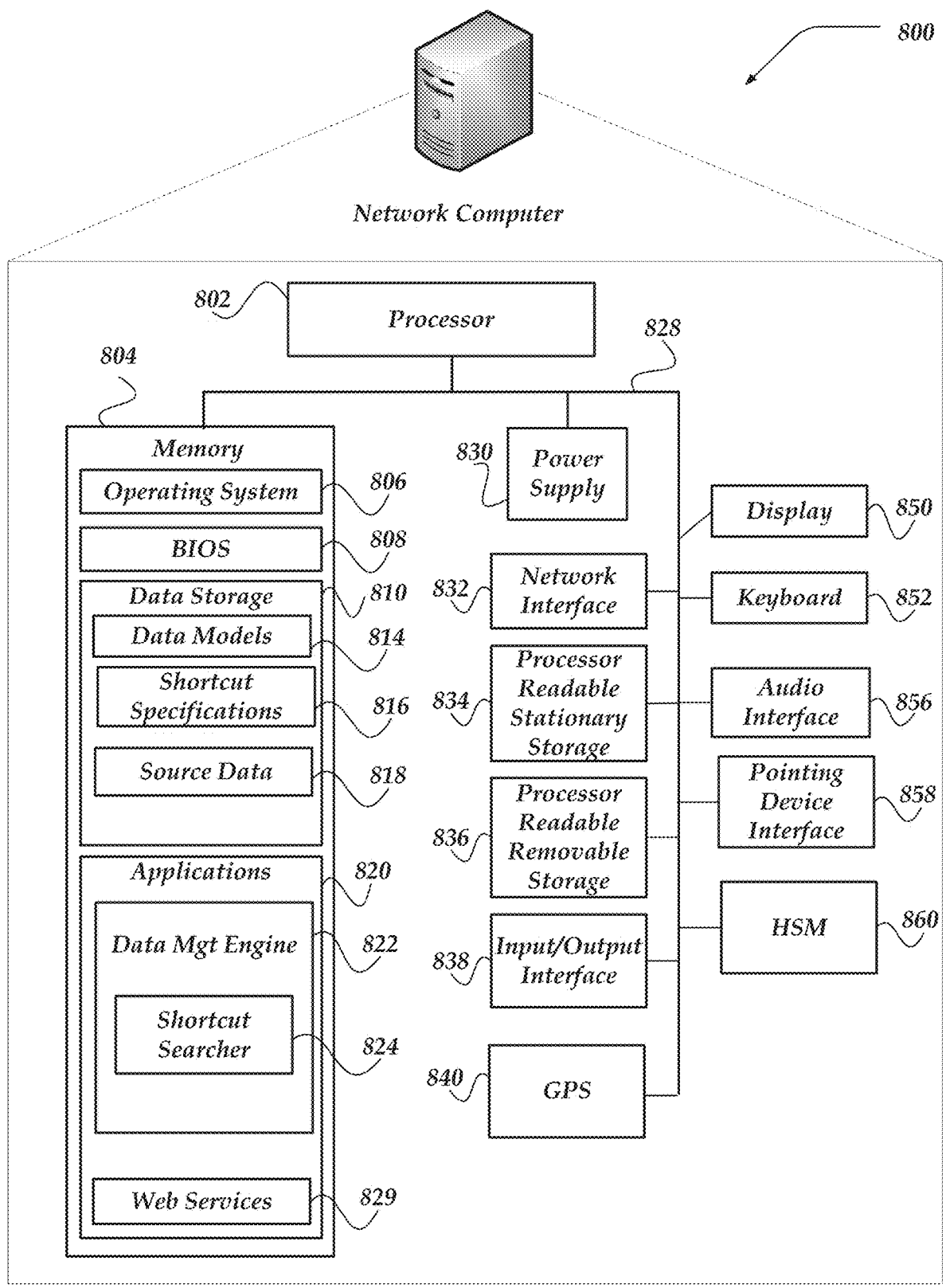
FIG. 8 shows one embodiment of a network computer that may be included in a system implementing one or more of the various embodiments.

FIG. 8 shows one embodiment of network computer 800 that may be included in a system implementing one or more of the various embodiments. Network computer 800 may include many more or less components than those shown in FIG. 8. However, the components shown are sufficient to disclose an illustrative embodiment for practicing these innovations. Network computer 800 may represent, for example, one embodiment of data management computer 616 of FIG. 6.

Network computers, such as, network computer 800 may include a processor 802 that may be in communication with a memory 804 via a bus 828. In some embodiments, processor 802 may be comprised of one or more hardware processors, or one or more processor cores. In some cases, one or more of the one or more processors may be specialized processors designed to perform one or more specialized actions, such as, those described herein. Network computer 800 also includes a power supply 830, network interface 832, audio interface 856, display 850, keyboard 852, input/output interface 838, processor-readable stationary storage device 834, and processor-readable removable storage device 836. Power supply 830 provides power to network computer 800.

Network interface 832 includes circuitry for coupling network computer 800 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 832 is sometimes known as a transceiver, transceiving device, or network interface card (NIC). Network computer 800 may optionally communicate with a base station (not shown), or directly with another computer.

Audio interface 856 is arranged to produce and receive audio signals such as the sound of a human voice. For example, audio interface 856 may be coupled to a speaker and microphone (not shown) to enable telecommunication with others or generate an audio acknowledgment for some action. A microphone in audio interface 856 can also be used for input to or control of network computer 800, for example, using voice recognition.

Display 850 may be a liquid crystal display (LCD), gas plasma, electronic ink, light emitting diode (LED), Organic LED (OLED) or any other type of light reflective or light transmissive display that can be used with a computer. In some embodiments, display 850 may be a handheld projector or pico projector capable of projecting an image on a wall or other object.

Network computer 800 may also comprise input/output interface 838 for communicating with external devices or computers not shown in FIG. 8. Input/output interface 838 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 838 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 800. Human interface components can be physically separate from network computer 800, allowing for remote input or output to network computer 800. For example, information routed as described here through human interface components such as display 850 or keyboard 852 can instead be routed through the network interface 832 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 858 to receive user input.

GPS transceiver 840 can determine the physical coordinates of network computer 800 on the surface of the Earth, which typically outputs a location as latitude and longitude values. GPS transceiver 840 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 800 on the surface of the Earth. It is understood that under different conditions, GPS transceiver 840 can determine a physical location for network computer 800. In one or more embodiments, however, network computer 800 may, through other components, provide other information that may be employed to determine a physical location of the client computer, including for example, a Media Access Control (MAC) address, IP address, and the like.

In at least one of the various embodiments, applications, such as, operating system 806, data management engine 822, shortcut searcher 824, web services 829, or the like, may be arranged to employ geo-location information to select one or more localization features, such as, time zones, languages, currencies, currency formatting, calendar formatting, or the like. Localization features may be used in documents, file systems, user-interfaces, reports, display objects, display models, visualizations as well as internal processes or databases. In at least one of the various embodiments, geo-location information used for selecting localization information may be provided by GPS 840. Also, in some embodiments, geolocation information may include information provided using one or more geolocation protocols over the networks, such as, wireless network 608 or network 611.

Memory 804 may include Random Access Memory (RAM), Read-Only Memory (ROM), or other types of memory. Memory 804 illustrates an example of computer-readable storage media (devices) for storage of information such as computer-readable instructions, data structures, program modules or other data. Memory 804 stores a basic input/output system (BIOS) 808 for controlling low-level operation of network computer 800. The memory also stores an operating system 806 for controlling the operation of network computer 800. It will be appreciated that this component may include a general-purpose operating system such as a version of UNIX, or Linux®, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 804 may further include one or more data storage 810, which can be utilized by network computer 800 to store, among other things, applications 820 or other data. For example, data storage 810 may also be employed to store information that describes various capabilities of network computer 800. The information may then be provided to another device or computer based on any of a variety of methods, including being sent as part of a header during a communication, sent upon request, or the like. Data storage 810 may also be employed to store social networking information including address books, buddy lists, aliases, user profile information, or the like. Data storage 810 may further include program code, data, algorithms, and the like, for use by a processor, such as processor 802 to execute and perform actions such as those actions described below. In one embodiment, at least some of data storage 810 might also be stored on another component of network computer 800, including, but not limited to, non-transitory media inside processor-readable removable storage device 836, processor-readable stationary storage device 834, or any other computer-readable storage device within network computer 800, or even external to network computer 800. Data storage 810 may include, for example, data models 814, source data 818, or the like. Data models 814 may store files, documents, versions, properties, meta-data, data structures, or the like, that represent one or more portions of one or more data models. Source Data 818 may represent memory used for storing databases, or other data sources that contribute the data that underlies the data models, or the like.

Applications 820 may include computer executable instructions which, when executed by network computer 800, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 820 may include data management engine 822, shortcut searcher 824, web services 829, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, data management engine 822, shortcut searcher 824, web services 829, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to data management engine 822, shortcut searcher 824, web services 829, or the like, may be provisioned and de-commissioned automatically.

Also, in one or more of the various embodiments, data management engine 822, shortcut searcher 824, web services 829, or the like, may be located in virtual servers running in a cloud-based computing environment rather than being tied to one or more specific physical network computers.

Further, network computer 800 may also include hardware security module (HSM) 860 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 860 may be a stand-alone network computer, in other cases, HSM 860 may be arranged as a hardware card that may be installed in a network computer.

Additionally, in one or more embodiments (not shown in the figures), network computer 800 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

What is claimed as new and desired to be protected by Letters Patent of the United States is:

1. A method, comprising:
at a computer system in communication with a display and one or more input devices, the computer system having one or more processors and memory storing one or more programs, wherein the one or more programs are configured to be executed by the one or more processors, the one or more programs including instructions for:
   displaying in a user interface, via the display, a data model that represents a plurality of relationships between a plurality of data objects, including a plurality of shortcuts, wherein:
      each data object is represented by a node in the data model and each data relationship is represented by at least one edge of a plurality of edges in the data model;

the data model is generated based on stored schemas and is stored in a graph-based database;

a plurality of nodes represent data objects selected from a group consisting of databases, tables, columns, workbooks, workflows, and other entities; and the plurality of shortcuts are generated based on one or more stored shortcut specifications that represent direct paths between respective nodes of the plurality of nodes;

detecting, via the one or more input devices, a user input corresponding to a request to delete a portion from the data model;

in response to the user input corresponding to the request to delete the portion from the data model, executing a query over the graph-based database;

in response to executing the query over the graph-based database, performing, via the one or more processors, operations including:

determining, via the one or more processors and based on the query over the graph-based database, a plurality of edges and a plurality of nodes to be deleted, wherein the plurality of edges and the plurality of nodes to be deleted are associated with the portion of the data model that is based on the data model;

determining, via the one or more processors and based on the query over the graph-based database, one or more critical edges from the plurality of edges to be deleted based on the data model, wherein each critical edge is associated with one or more nodes of the plurality of nodes to be deleted that are included in the portion of the data model and one or more other nodes that are exterior to the portion of the data model;

selectively, via the one or more processors and based on the query over the graph-based database, traversing the data model based on the one or more critical edges;

determining, via the one or more processors and based on the query over the graph-based database, one or more critical shortcuts based on the selective traversal and one or more shortcut specifications matching the one or more critical shortcuts, wherein the one or more critical shortcuts are associated with at least one critical edge; and modifying, via the one or more processors and based on the query over the graph-based database, the data model by deleting critical shortcut that do not match the one or more shortcut specifications and deleting the portion of the data model, including the plurality of nodes and edges associated with the portion; and displaying in the user interface, via the display, one or more undeleted portions of the modified data model.

2. The method of claim 1, wherein determining the one or more critical shortcuts further comprises:

comparing the portion of the data model to the one or more shortcut specifications, wherein the comparison evaluates one or more of a data type of a node, a relationship type of an edge, or a length of a path between two nodes; and determining the one or more shortcut specifications matching the one or more critical shortcuts based on the comparison.

3. The method of claim 1, wherein the portion of the data model to be deleted further comprises one or more graphlets that include respective subsets of the plurality of nodes.

4. The method of claim 1, further comprising:

providing the one or more shortcut specifications, wherein the one or more shortcut specifications declare one or more criteria for generating shortcuts in the data model, wherein the one or more criteria include one or more of a path length, a node type, a data types, or an edge type.

5. The method of claim 1, wherein determining the one or more critical shortcuts based on the selective traversal further comprises:

determining one or more new shortcuts based on the one or more shortcut specifications matching the one or more critical shortcuts; and including the one or more new shortcuts in the data model.

6. The method of claim 1, wherein determining the one or more critical edges further comprises:

determining a flow direction associated with each of the plurality of edges; and determining the one or more critical edges based on the flow direction associated with the portion of the one or more edges, wherein each critical edge is associated with an edge that is directed into the portion of the data model and another edge directed away from the portion of the data model.

7. The method of claim 1, wherein the operations further include modifying the data model by replacing a shortcut of the shortcuts that does not match the one or more shortcut specifications with another shortcut of the shorts that does match the one or more shortcut specifications based on the one or more undeleted portions of the modified data model.

8. A computer system, comprising:

one or more processors; and memory storing one or more programs configured for execution by the one or more processors, wherein the computer system is in communication with a display and one or more input devices, and the one or more programs comprising instructions for:

displaying in a user interface, via the display, a data model that represents a plurality of relationships between a plurality of data objects, including a plurality of shortcuts, wherein;

each data object is represented by a node in the data model and each data relationship is represented by at least one edge of a plurality of edges in the data model;

the data model is generated based on stored schemas and is stored in a graph-based database;

a plurality of nodes represent data objects selected from a group consisting of databases, tables, columns, workbooks, workflows, and other entities; and the plurality of shortcuts are generated based on one or more stored shortcut specifications that represent direct paths between respective nodes of the plurality of nodes;

detecting, via the one or more input devices, a user input corresponding to a request to delete a portion from the data model;

in response to the user input corresponding to the request to delete the portion from the data model, executing a query over the graph-based database;

in response to executing the query over the graph-based database, performing, via the one or more processors, operations including:

determining, via the one or more processors and based on the query over the graph-based database, a plurality of edges and a plurality of nodes to be deleted, wherein the plurality of edges and the plurality of nodes to be deleted are associated with the portion of the data model that is based on the data model;

determining, via the one or more processors and based on the query over the graph-based database, one or more critical edges from the plurality of edges to be deleted based on the data model, wherein each critical edge is associated with one or more nodes of the plurality of nodes to be deleted that are included in the portion of the data model and one or more other nodes that are exterior to the portion of the data model;

selectively, via the one or more processors and based on the query over the graph-based database, traversing the data model based on the one or more critical edges;

determining, via the one or more processors and based on the query over the graph-based database, one or more critical shortcuts based on the selective traversal and one or more shortcut specifications matching the one or more critical shortcuts, wherein the one or more critical shortcuts are associated with at least one critical edge; and modifying, via the one or more processors and based on the query over the graph-based database, the data model by deleting critical shortcuts that do not match the one or more shortcut specifications and deleting the portion of the data model, including the plurality of nodes and edges associated with the portion; and displaying in the user interface, via the display, one or more undeleted portions of the modified data model in the user interface.

9. The computer system of claim 8, wherein determining the one or more critical shortcuts further comprises:
comparing the portion of the data model to the one or more shortcut specifications, wherein the comparison evaluates one or more of a data type of a node, a relationship type of an edge, or a length of a path between two nodes; and
determining the one or more shortcut specifications matching the one or more critical shortcuts based on the comparison.

10. The system of claim 8, wherein the portion of the data model to be deleted, further comprises, one or more graphlets that include respective subsets of the plurality of nodes.

11. The computer system of claim 8, further comprising:
providing the one or more shortcut specifications, wherein the one or more shortcut specifications declare one or more criteria for generating shortcuts in the data model, wherein the one or more criteria include one or more of a path length, a node type, a data types, or an edge type.

12. The computer system of claim 8, wherein determining the one or more critical shortcuts based on the selective traversal further comprises:
determining one or more new shortcuts based on the one or more shortcut specifications matching the one or more critical shortcuts; and
including the one or more new shortcuts in the data model.

13. The computer system of claim 8, wherein determining the one or more critical edges further comprises:
determining a flow direction associated with each of the plurality of edges; and
determining the one or more critical edges based on the flow direction associated with the portion of the one or more edges, wherein each critical edge is associated with an edge that is directed into the portion of the data model and another edge directed away from the portion of the data model.

14. The computer system of claim 8, wherein the one or more programs further comprise instructions for modifying the data model by replacing a shortcut of the shortcuts that does not match the one or more shortcut specifications with another shortcut of the shorts that does match the one or more shortcut specifications based on the one or more undeleted portions of the modified data model.

15. A non-transitory computer readable storage medium storing one or more programs, the one or more programs comprising instructions that when executed by a computer system having one or more processors and in communication with a display and one or more input devices, cause the computer system to perform a method comprising:
displaying in a user interface, via the display, a data model that represents a plurality of relationships between a plurality of data objects, including a plurality of shortcuts, wherein:
each data object is represented by a node in the data model and each data relationship is represented by at least one edge of a plurality of edges in the data model;
the data model is generated based on stored schemas and is stored in a graph-based database;
a plurality of nodes represent data objects selected from a group consisting of databases, tables, columns, workbooks, workflows, and other entities; and
the plurality of shortcuts are generated based on one or more stored shortcut specifications that represent direct paths between respective nodes of the plurality of nodes;
detecting, via the one or more input devices, a user input corresponding to a request to delete a portion from the data model;
in response to the user input corresponding to the request to delete portion from the data model executing a query over the graph-based database;
in response to executing the query over the graph-based database, performing, via the one or more processors, operations including:
determining, via the one or more processors and based on the query over the graph-based database, a plurality of edges and a plurality of nodes to be deleted, wherein the plurality of edges and the plurality of nodes to be deleted are associated with the portion of the data model that is based on the data model;
determining, via the one or more processors and based on the query over the graph-based database, one or more critical edges from the plurality of edges to be deleted based on the data model, wherein each critical edge is associated with one or more nodes of the plurality of nodes to be deleted that are included in the portion of the data model and one or more other nodes that are exterior to the portion of the data model;
selectively, via the one or more processors and based on the query over the graph-based database, traversing the data model based on the one or more critical edges;
determining, via the one or more processors and based on the query over the graph-based database, one or more critical shortcuts based on the selective traversal and one or more shortcut specifications matching the one or more critical shortcuts, wherein the one or more critical shortcuts are associated with at least one critical edge; and modifying, via the one or more processors and based on the query over the graph-based database, the data model by deleting critical shortcuts that do not match the one or more shortcut specifications and deleting the portion of the data model, including the plurality of nodes and edges associated with the portion; and displaying in the user interface, via the display, one or more undeleted portions of the modified data model.

16. The non-transitory computer readable storage medium of claim 15, wherein determining the one or more critical shortcuts further comprises:

comparing the portion of the data model to the one or more shortcut specifications, wherein the comparison evaluates one or more of a data type of a node, a relationship type of an edge, or a length of a path between two nodes; and determining the one or more shortcut specifications matching the one or more critical shortcuts based on the comparison.

17. The non-transitory computer readable storage medium of claim 15, wherein the portion of the data model to be deleted further comprises, one or more graphlets that include respective subsets of the plurality of nodes.

18. The non-transitory computer readable storage medium of claim 15, further comprising:

providing the one or more shortcut specifications, wherein the one or more shortcut specifications declare one or more criteria for generating shortcuts in the data model, wherein the one or more criteria include one or more of a path length, a node type, a data types, or an edge type.

19. The non-transitory computer readable storage medium of claim 15, wherein determining the one or more critical shortcuts based on the selective traversal, further comprises:

determining one or more new shortcuts based on the one or more shortcut specifications matching the one or more critical shortcuts; and including the one or more new shortcuts in the data model.

20. The non-transitory computer readable storage medium of claim 15, wherein determining the one or more critical edges further comprises:

determining a flow direction associated with each of the plurality of edges; and determining the one or more critical edges based on the flow direction associated with the portion of the one or more edges, wherein each critical edge is associated with an edge that is directed into the portion of the data model and another edge directed away from the portion of the data model.

* * * * *